(12) United States Patent
Adams et al.

(10) Patent No.: US 10,135,482 B2
(45) Date of Patent: Nov. 20, 2018

(54) WIRELESS TRANSCEIVER WITH REMOTE FRONTEND

(71) Applicant: Avago Technologies General IP (Singapore) Pte. Ltd., Singapore (SG)

(72) Inventors: Andrew Robert Adams, Stanmore (AU); Ali Afsahi, San Diego, CA (US); Arya Reza Behzad, Los Altos, CA (US); Keith Andrews Carter, Poway, CA (US); Hooman Darabi, Laguna Niguel, CA (US); Rohit V. Gaikwad, San Diego, CA (US); Dandan Li, San Diego, CA (US); Jianping Peng, Cupertino, CA (US); Jacob Jude Rael, Lake Forest, CA (US); Tirdad Sowlati, Irvine, CA (US)

(73) Assignee: Avago Technologies General IP (Singapore) PTE. LTD., Singapore (SG)

(*) Notice: Subject to any disclaimer, the term of this patent is extended or adjusted under 35 U.S.C. 154(b) by 0 days.

(21) Appl. No.: 15/464,270

(22) Filed: Mar. 20, 2017

(65) Prior Publication Data

US 2017/0279479 A1 Sep. 28, 2017

Related U.S. Application Data

(60) Provisional application No. 62/312,424, filed on Mar. 23, 2016.

(51) Int. Cl.
*H04W 84/12* (2009.01)
*H04B 1/40* (2015.01)
(Continued)

(52) U.S. Cl.
CPC ............. *H04B 1/40* (2013.01); *H04B 1/0057* (2013.01); *H04B 1/0483* (2013.01); *H04W 4/80* (2018.02)

(58) Field of Classification Search
USPC .......................... 375/216, 350; 370/230, 329
See application file for complete search history.

(56) References Cited

U.S. PATENT DOCUMENTS 7,075,909 B1 * 7/2006 Iinuma ................. H04W 52/50
370/329
2014/0140455 A1 * 5/2014 Mirzaei ................. H04B 1/006
375/350

(Continued)

FOREIGN PATENT DOCUMENTS

WO WO-2014/164229 A1 10/2014

*Primary Examiner* — Eva Puente

(74) *Attorney, Agent, or Firm* — Morgan, Lewis & Bockius LLP

(57) ABSTRACT

A wireless communication device includes a first circuit including a baseband circuit and a radio circuit, and at least one frontend module (FEM) remote from the first circuit and placed in close proximity to and coupled to at least one radio-frequency (RF) antenna. The FEM is coupled to the first circuit via interface circuitry. An FEM comprises a frontend (FE) circuit including one or more low-noise amplifiers (LNAs), one or more power amplifiers (PAs), and at least one of a multi-pole switch and a multiplexer. The multi-pole switch and the multiplexer being implemented on a first side of the FEM coupled to the interface circuitry. The interface circuitry includes at least some of filters, splitters, multi-pole switches, and multiplexers to reduce a count of interconnect routes to the at least one FEM.

30 Claims, 17 Drawing Sheets

(51) Int. Cl.
*H04W 4/80* (2018.01)
*H04B 1/00* (2006.01)
*H04B 1/04* (2006.01)

(56) References Cited

U.S. PATENT DOCUMENTS

2016/0094254 A1* 3/2016 Ripley ................. H04B 1/0475
 455/114.3
2016/0127026 A1* 5/2016 Wloczysiak ............. H04B 7/08
 370/230
2016/0226544 A1* 8/2016 Talty .................... H04B 1/0007
2017/0245208 A1* 8/2017 Sirotkin ................ H04W 48/18

* cited by examiner

WIRELESS TRANSCEIVER WITH REMOTE FRONTEND

CROSS-REFERENCE TO RELATED APPLICATIONS

This application claims the benefit of priority under 35 U.S.C. § 119 from U.S. Provisional Patent Application 62/312,424 filed Mar. 23, 2016, which is incorporated herein by reference in its entirety.

TECHNICAL FIELD

The present description relates generally to wireless communications, and more particularly, to a wireless transceiver with remote frontend.

BACKGROUND

A wireless communication device may include a Wi-Fi module including one or more system-on-chip (SOC) and a number of frontend modules (FEMs). The SOC can include baseband and radio circuits, and a power management unit (PMU), among other circuits. The radio can include up and down (up/down) conversion mixers, low noise amplifiers (LNAs) in the receive (RX) path and power amplifiers (PAs) in the transmit (TX) path. The FEMs can be coupled to the SOC via filters, splitters and/or combiners through conductive routes on the Wi-Fi module. The Wi-Fi module is traditionally at a distance from antennas that, for example, in a mobile communication device can be positioned on the edges of the device motherboard (e.g., a multi-layer board (MLB)). Filters and multiplexer (e.g., diplexers and triplexers) are usually placed in close proximity to the Wi-Fi module and are coupled to the antennas through long radio-frequency (RF) routes on the MLB. Each FEM can include LNAs and PAs for RX and TX path, as well as one or more switches (e.g., a TX/RX switch)

The wireless communication device may include, for example, Wi-Fi channels such as 2 GHz (e.g., with a frequency band between about 2.4-2.8 GHz) and 5 GHz (e.g., with a frequency band between about 4.9-5.9 GHz) Wi-Fi channels, as well as, a Bluetooth channel (e.g., with a frequency band between about 2.4-2.485 GHz). The wireless communication device may be a multi-input-multi-output (MIMO) device with multiple antennas and with the SOC radio including a number of radio cores. The radio cores can, for example, be partitioned into a main core and an auxiliary (aux) core. For instance, each of the main core and the aux core can include multiple radios, for example, 2 GHz radio cores (e.g., 2 GHz core-0 and 2 GHz core-1) and 5 GHz radio cores (e.g., 5 GHz core-0 and 5 GHz core-1).

The traditional configuration of the Wi-Fi module that includes the FEMs has to be coupled to the antennas through long RF routes in MLB that can introduce high insertion loss at PA(s) output(s) and/or at LNA(s) input(s) and therefore compromise the communication device performance. The placement of the FEMs in the SOC further reduces device features due to the size limitation of the Wi-Fi module. Therefore, solutions are needed to address this shortcomings of the traditional Wi-Fi modules.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, communication devices including Wi-Fi modules having a number of remote front-end modules (FEMs) are disclosed. The remote FEMs of the subject technology are placed in close proximity of one or more RF antennas and are coupled to a system-on-chip (SOC) via interface circuitry including reduced number of interconnects (e.g., by a factor of 2) between the remote FEMs and the SOC. The subject technology, substantially reduces the insertion loss at power amplifier(s) output(s) and/or at LNA(s) input(s) of the traditional solutions. The placement of the FEMs remote from the SOC further allows implementation of more device features due to the additional space provided on the SOC by removing the FEMs and associated routings from the SOC.

Figure 1:
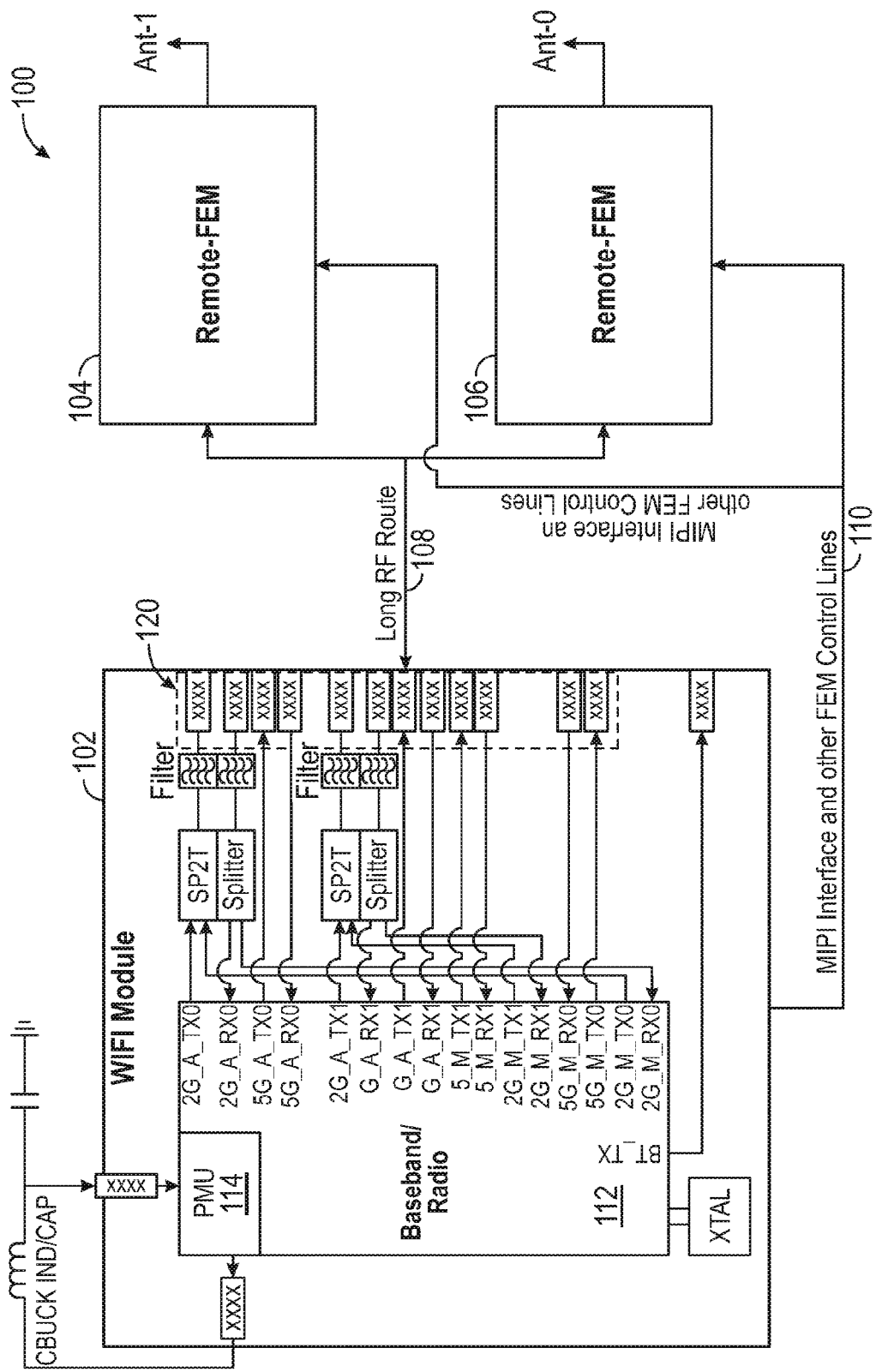
FIG. 1 is a high-level diagram illustrating an example of a wireless communication device with remote front-end modules (FEMs) according to aspects of the subject technology.

FIG. 1 is a high-level diagram illustrating an example of a wireless communication device 100 with remote FEMs 104 and 106, according to aspects of the subject technology. The wireless communication device 100 can be a multiple-input-multiple-output (MIMO) communication device such as a mobile communication device (e.g., a cell phone, a tablet, a phablet, or other hand-held communication devices). In some implementations, the wireless communication device 100 includes a Wi-Fi module 102 implemented as a SOC (also referred to as a first circuit) and a number of remote FEMs such as 104 and 106 placed in close proximity of a number of antennas, for example, Ant-0 and Ant-1. The Wi-Fi module 102 is coupled to the remote FEMs 104 and 106 via an interface circuitry including RF routes 108 and interface (e.g., mobile industry processor interface (MIPI)) and other FEM control lines 110.

The Wi-Fi module 102 includes a power management unit (PMU) 114, baseband and radio circuits 112, and a number of filters, splitters, and switches (e.g., single-pole-double throw (SP2T) switches) coupling baseband and radio circuits 112 to the RF routes 108 via connection ports 120. The Wi-Fi module 102 is well-known and further discussion of its components is skipped for brevity.

Figure 2:
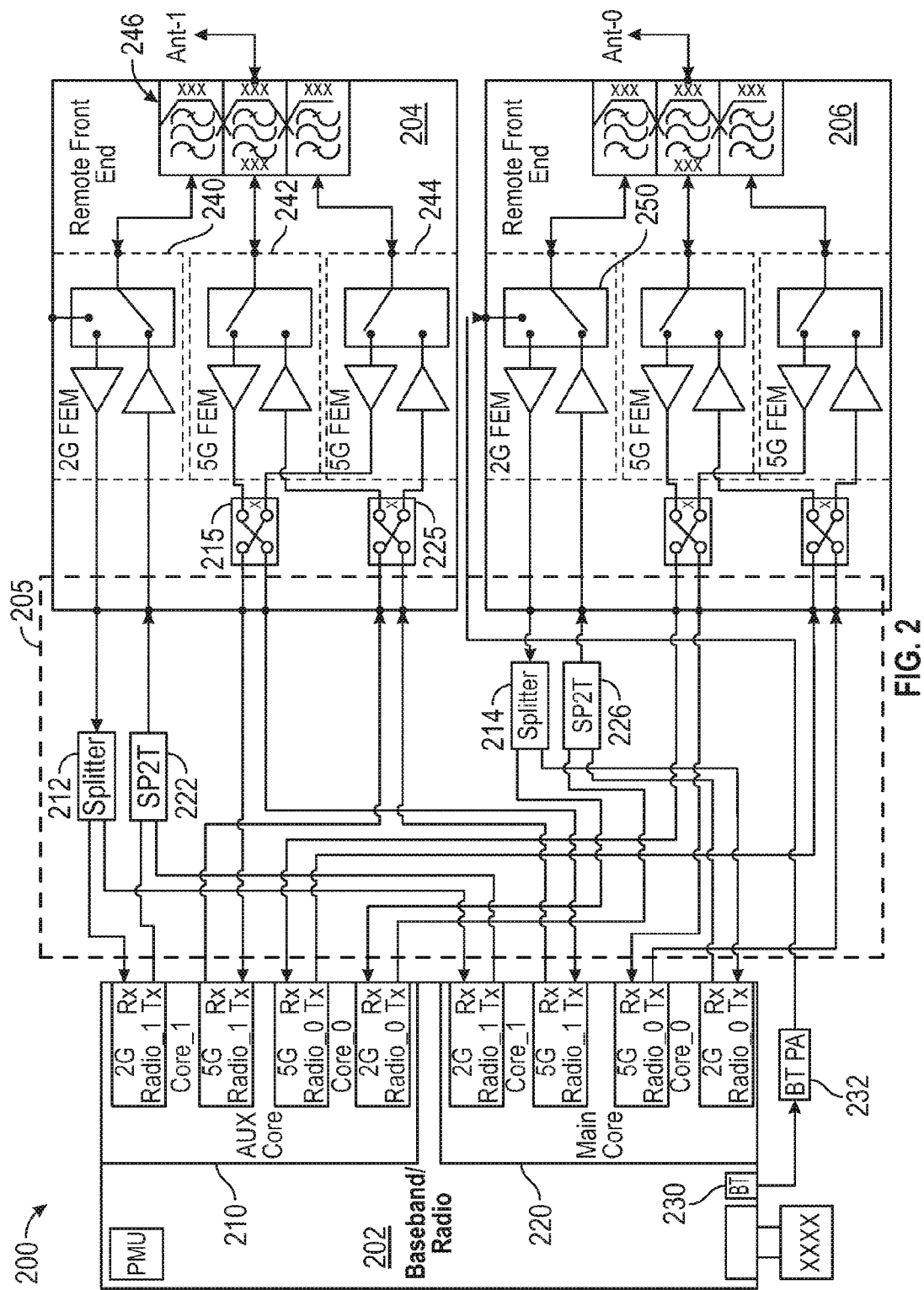
FIG. 2 is a schematic diagram illustrating an example of a wireless communication device with remote FEMs according to aspects of the subject technology.

FIG. 2 is a schematic diagram illustrating an example of a wireless communication device 200 with remote FEMs according to aspects of the subject technology. The wireless communication device 200 includes a radio and baseband circuit 202, a first FEM 204, a second FEM 206, a first RF antenna Ant-0, a second RF antenna Ant-1, and an interface circuitry 205. The number of FEMS and RF antennas are not limited to two and can be any practical number (e.g., 4, 6, etc.).

In some aspects, the radio and baseband circuit 202 is implemented as a SOC and includes, among other modules and components, aux core radios 210 (hereinafter "aux core 210"), main core radios 220 (hereinafter "main core 220"), and a Bluetooth (BT) radio 230. The aux core 210 includes a first 2.4 GHz (2 G) radio-1, a second 2 G radio-0, a first 5.4 GHz (5 G) radio-1, and a second 5 G radio-0. The main core 220 includes a first 2 G radio-1, a second 2 G radio-0, a first 5 G radio-1, and a second 5 G radio-0. The first 2 G radio-1, the second 2 G radio-0, the first 5 G radio-1, and the second 5 G radio-0 of the aux core and the main core communicate their respective 2 G-1, 2 G-0, 5 G-1, and 5 G-0 radio signals to the interface circuitry 205.

The first and second FEMs 204 and 206 are placed remote from the SOC (radio and baseband circuit 202) and are coupled to the SOC via the interface circuitry 205. In some implementations, the first FEM 204 includes, but is not limited to, a first front-end (FE) circuit 240, a second FE circuit 242, and a third FE circuit 244, a first switch 215, a second switch 225, and a multiplexer 246. The first FE circuit 240 is a 2 G FE circuit and includes a 2 G low-noise-amplifier (LNA), a 2 G power amplifier (PA) in its respective receive (RX) and transmit (TX) paths, and a transmit/receive (TR) switch. The TR switch can be implemented as a single-pole-triple-throw (SP3T) switch to allow one of the TX or RX paths to be coupled to the multiplexer 246. The second FE circuit 242 is a 5 G FE circuit and includes 5 G LNA, a 5 G PA, and a TR switch such as a SP3T switch. The third FE circuit 244 is a 5 G FE circuit similar to the second FE circuit 242.

In some implementations, the first switch 215 is a double-pole-double-throw (DPDT) switch that selectively couple one of its inputs to a respective RX path of the second FE circuit 242 or the third FE circuit 244. The second switch 225 is a DPDT switch that selectively couple one of its inputs to a respective TX path of the second FE circuit 242 or the third FE circuit 244. In one or more implementations, the multiplexer 246 is a triplexer that can allow simultaneous communication of 2 G and 5 G RF signals between the first FEM 204 and Ant-1. For example, the FEM 204 can simultaneously transmit or receive a 2 G RF signal while transmitting or receiving two 5 G RF signals. In some implementations, the multiplexer 246 includes three band-pass filters (BPFs) with band-pass frequencies corresponding to the frequencies of the first, second, and third FE circuit 240, 242, and 244. In some implementations, the second FEM 206 is similar to the first FEM 204 described above, except that a BT signal routed from the BT radio 230 is coupled to the SP3T switch 250 to allow BT communication instead of 2 G RF signal communication with the RF antenna (Ant-0).

The interface circuitry 205 interfaces the SOC 202 to the first and second FEMs 204 and 206 with reduced number of routings for RF signals. In one or more implementations, the interface circuitry 205 includes a first splitter 212, a second splitter 214, a first switch 222 (e.g., a SP2T switch), a second switch 226, a BT PA 232, and corresponding routings implemented on a board, for example, a printed circuit board (PCB), on which the SOC 202, the first and second FEM 204 and 206, and the interface circuitry 205 are realized. The first splitter 212 couples 2 G RX signals from 2 G radio-1 of the aux core 210 and main core 220 to the RX path of the first FE circuit 240. The first SP2T switch 222 couples 2 G TX signals from 2 G radio-1 of the aux core 210 and main core 220 to the TX path of the first FE circuit 240. The TX 5 G signals from 5 G radio-1 of the aux core 210 and main core 220 are coupled via respective interconnect routes to the inputs of the first switch 215 of the first FEM 204. The RX 5 G signals from 5 G radio-1 of the aux core 210 and main core 220 are coupled via respective interconnect routes to the inputs of the second switch 225 of the first FEM 204. Similarly, the second splitter 214, the second switch 226 and similar routings couple signals from the 2 G radio-0 and 5 G-radio-0 of the aux core 210 and main core 220 to the second FEM 206. The BT PA 232 amplifies a BT signal from the BT radio 230 and sends it via a respective routing to the SP3T switch 250 of the second FEM 206 for transmission through Ant-0.

Figure 3:
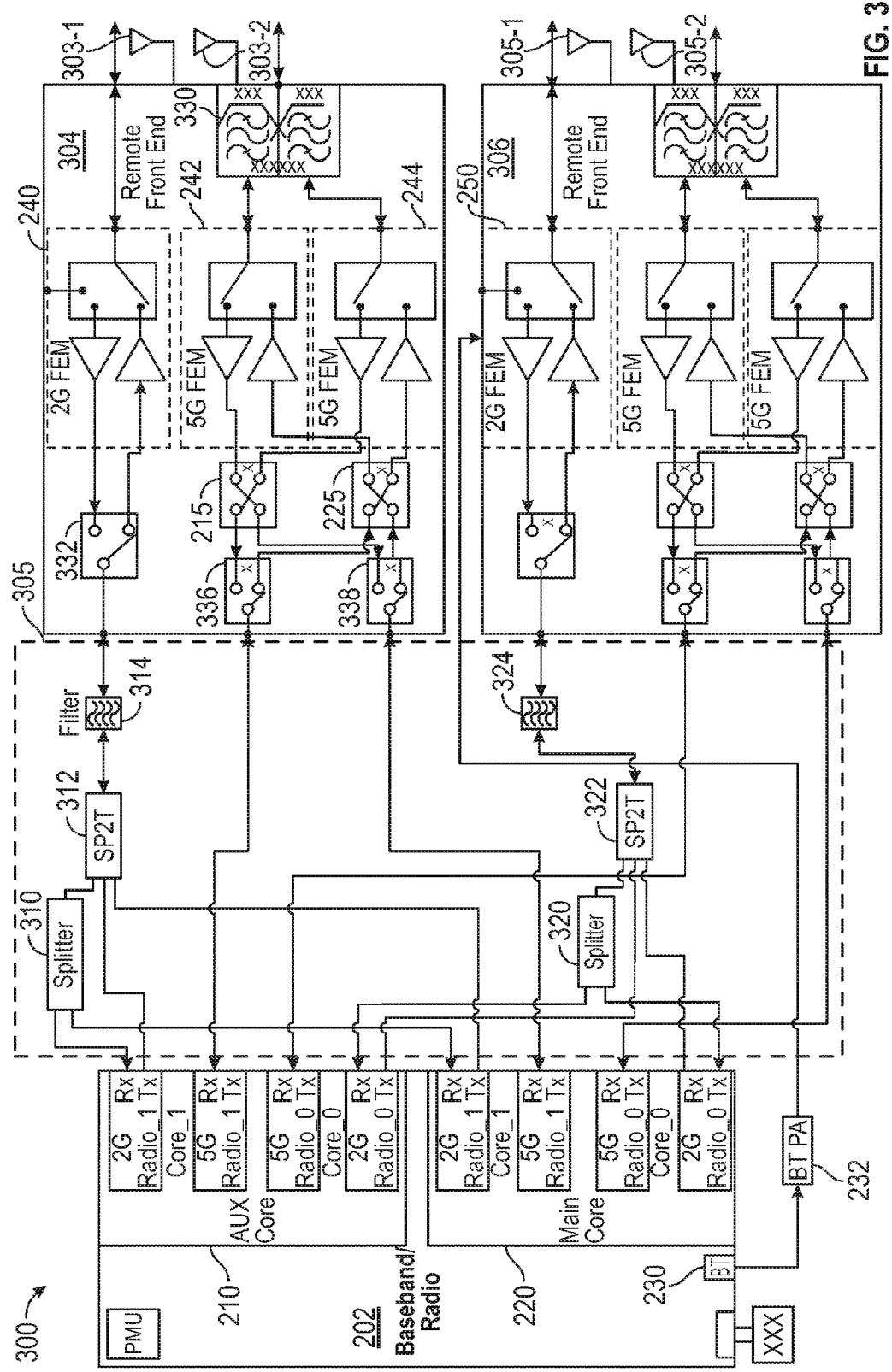
FIG. 3 is a schematic diagram illustrating an example of a wireless communication device with remote FEMs according to aspects of the subject technology.

FIG. 3 is a schematic diagram illustrating an example of a wireless communication device 300 with remote FEMs according to aspects of the subject technology. The wireless communication device 300 includes the radio and baseband circuit 202, a first FEM 304, a second FEM 306, RF antennas 303-1, 303-2, 305-1, and 305-2, and an interface circuitry 305. The number of FEMS and RF antennas are not limited to the above-mentioned and can be any practical number (e.g., 4, 6, etc.). In some aspects, the radio and baseband circuit 202 is implemented as a SOC and is structurally and functionally the same as discussed above with respect to FIG. 2.

The FEMs 304 and 306 are placed remote from the SOC (radio and baseband circuit 202) and are coupled to the SOC via the interface circuitry 305. In some implementations, the first FEM 304 includes the first FE circuit 240, the second FE circuit 242, the third FE circuit 244, the first switch 215 and the second switch 225, as discussed above with respect to FIG. 2, except that in the second and third FE circuits 242 and 244, the SP3T switch can be replaced with SP2T switches. The first FEM 304 further includes, but is not limited to, a first TR switch 336, a second TR switch 338, and a multiplexer 330 coupled to one or more RF antennas 303.

The first TR switches 336 is a SP2T switch that selectively couples its first port (coupled to the interface circuitry 305) to first ports of the first switch 215 or the second switch 225. For, example, if the signal coming to its first port from the interface circuitry 305 is a TX signal, the first TR switch 336 couples to the second switch 225, and when an RX signal is received from one of the second or third FE circuits 242 or 244, the first TR switches 336 couples the first switch 215 to its input ports. The second TR switches 338 is a SP2T switch that selectively couples its first port (coupled to the interface circuitry 305) to second ports of the first switch 215 or the second switch 225. For example, if one of the second or third FE circuits 242 or 244 is transmitting, the second TR switch 338 couples the second switch 225 to its input port for communication to the interface circuit 305. The third and fourth ports of the first switch 215 and the second switch 225 are coupled to the second and third FE circuits 242 and 244, as described above with respect to FIG. 2. The multiplexer 330 can be a duplexer that couples the second and third FE circuits 242 and 244 to one of the RF antennas 303 (e.g., 303-2). In some implementations, the first FE circuits 240 can be coupled to the RF antenna 303-1. In some implementations, only one of the RF antennas (e.g., 303-1) is employed and coupled to the first FE circuits 240 and the multiplexer 330 through another multiplexer (not shown for simplicity). The structure and functionalities of the second FEM 306 is similar to the first FEM 304.

The interface circuitry 305 interfaces the SOC 202 to the first and second FEMs 304 and 306 with reduced number of routings for RF signals. In one or more implementations, the interface circuitry 305 includes a first splitter 3110, a second splitter 320, a first switch 312 (e.g., a SP3T switch), a second switch 322, a first filter 314, a second filter 324, the BT PA 232, and corresponding routings implemented on a board, for example, a printed circuit board (PCB), on which the SOC 202, the first and second FEM 304 and 306, and the interface circuitry 205 are realized. The first splitter 310 couples 2 G RX signals from 2 G radio-1 of the aux core 210 and main core 220 to a first port of the first switch 312. The 2 G TX signals from 2 G radio-1 of the aux core 210 and main core 220 are coupled to the second and third ports of the first switch 312. The first switch 312 selectively communicates one of the 2 G RX signals or the 2 G TX signals of the aux core 210 and main core 220 through the first filter 314 (e.g., an inter-stage filter, such as a saw filter) to the TR switch 332 of the first FEM 304. The 5 G RX and TX signals from the 5 G radio-1 of the aux core 210 are directly communicated via a single route to the TR switch 336 of the first FEM 304, and The 5 G RX and TX signals from the 5 G radio-1 of the main core 220 are directly communicated via another single route to the TR switch 338 of the first FEM 304.

Similarly, the second splitter 320, the second switch 322, the second filter 324 and similar routings couple signals from the 2 G radio-0 and 5 G-radio-0 of the aux core 210 and main core 220 to the second FEM 306. The BT PA 232 amplifies a BT signal from the BT radio 230 and sends it via a respective routing to the SP3T switch 250 of the second FEM 306 for transmission through RF antenna 303-1.

Figure 4:
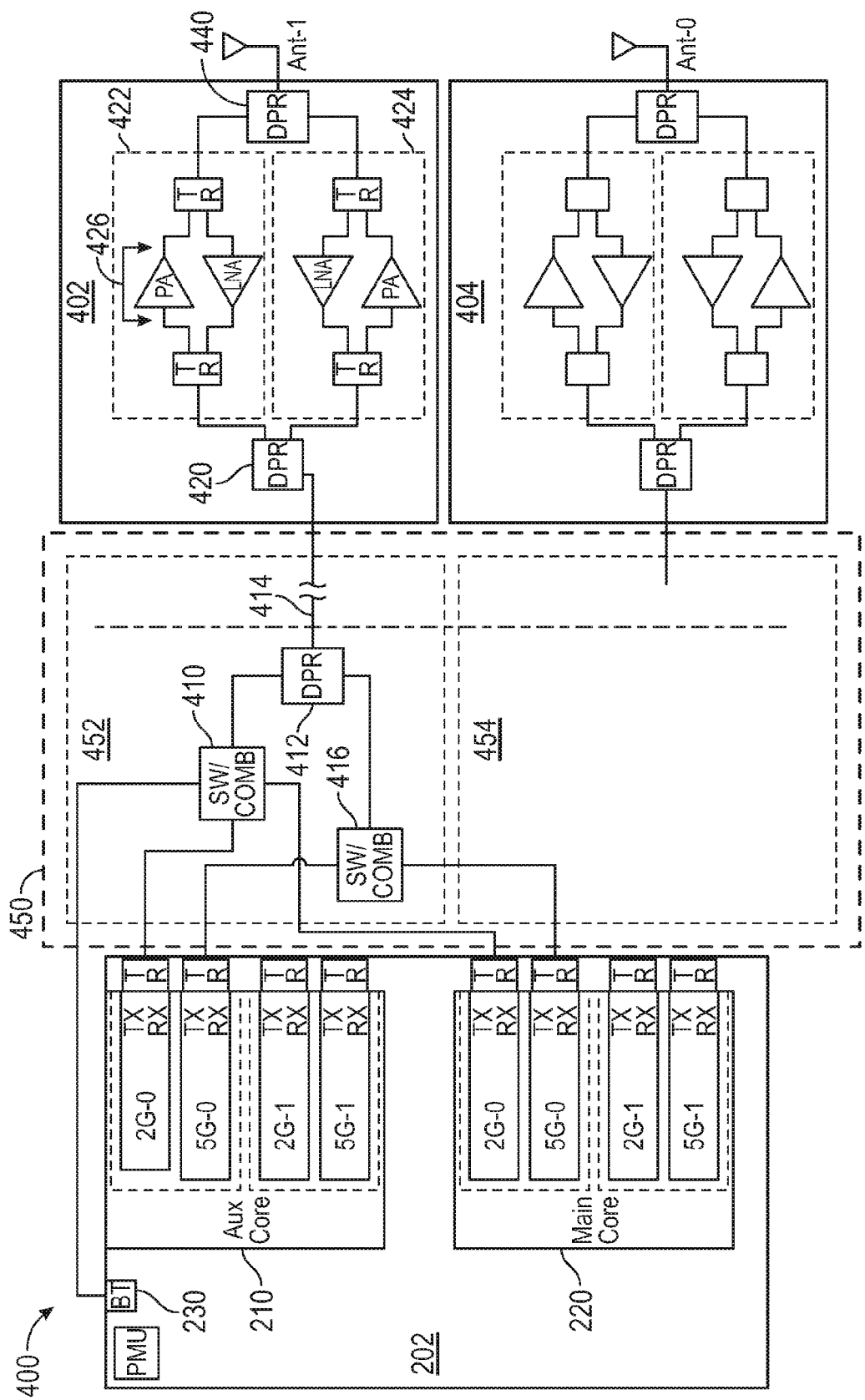
FIG. 4 is a schematic diagram illustrating an example of a wireless communication device with remote FEMs according to aspects of the subject technology.

FIG. 4 is a schematic diagram illustrating an example of a wireless communication device 400 with remote FEMs according to aspects of the subject technology. The wireless communication device 400 includes a radio and baseband circuit 202, a first FEM 402, a second FEM 404, a first RF antenna Ant-1, a second RF antenna Ant-0, and an interface circuitry 450. The number of FEMS and RF antennas are not limited to two and can be any practical number (e.g., 4, 6, etc.).

The radio and baseband circuit 202 is structurally and functionally similar to the radio and baseband circuit 202 of FIGS. 2 and 3, except that each of the 2 G radio-0, 2 G radio-1, 5 G radio-0, and 5 G radio-1 of the aux core 210 and the main core 220 are coupled to a respective TR switch that can communicate either a TX or an RX signal to the interface circuit 450.

The first and second FEMs 402 and 404 are placed remote from the SOC (radio and baseband circuit 202) and are coupled to the SOC via the interface circuitry 450. In some implementations, the first FEM 402 includes, but is not limited to, a FE circuit 422, a second FE circuit 424, a first multiplexer 420 (e.g., a diplexer), and a multiplexer 440 (e.g., a diplexer). In some implementations, the diplexers 420 and 440 can be implemented with BP filters that can direct the 2 G and 5 G signals to respective 2 G and 5 G ports of each diplexer. The first FE circuit 422 is a 2 G FE circuit and includes a 2 G LNA, a 2 G PA in its respective receive (RX) and transmit (TX) paths, a first TR switch, and a second TR switch. The first and second TR switches can be implemented as SP3T switches to allow one of the TX or RX paths to be coupled to the multiplexers 420 and 440. In some implementations, a by-pass path 426 allows bypassing the PA of the 2 G TX path, for example, for low-power BT communication. The second FE circuit 242 is a 5 G FE circuit and includes a 5 G LNA, a 5 G PA, and TR switches similar to the first and second TR switches of the first FE circuit 422. In some implementations, the second FEM 404 is similar to the first FEM 402 described above and is coupled to the RF antenna (Ant-0).

The interface circuitry 450 includes an interface circuit 452 and an interface circuit 452. The interface circuit 452 couples the SOC 202 to the first FEM 402 with reduced number of routings for RF signals. The interface circuit 454, the details of which are not shown, is similar to the interface circuit 452 and similarly couples the SOC 202 to the second FEM 404.

In one or more implementations, the interface circuit 452 includes a first switch/combiner 410, a second switch/combiner 416, a multiplexer (e.g., a diplexer) 412, and a single interconnect route 414 (e.g., a conductive link such as PCB route or a cable). The first switch/combiner 410, the second switch/combiner 416, and the diplexer 412 are placed in close proximity to the SOC 202 and are coupled through the single interconnect route 414 to the first FEM 402. The first switch/combiner 410 couples the BT radio 230, the 2 G radio-0 of the aux core 210 and 2 G radio-0 of the main core 220 to a 2 G port of the diplexer 412. The second switch/combiner 416 couples the 5 G radio-0 of the aux core 210 and 5 G radio-0 of the main core 220 to a 5 G port of the diplexer 412. The diplexer 412 is coupled via the single interconnect route 414 to the diplexer 420 of the FEM 402. The configuration of the interface 452 allows communication of 2 G RF or BT signals simultaneously with 5 G RF signals through Ant-1.

Similarly, the interface circuit 454 couples the 2 G radio-1 of the aux core 210 and the main core 220 and 5 G radio-1 of the aux core 210 and the main core 220 to the second FEM 404 for communication to the Ant-0. In some implementations, digital predistortion (DPD) for the PAs of the first FEM 402 can be performed by an over-the-air loop back through the Ant-0 of the second FEM 404. Similarly, the DPD for the PAs of the second FEM 404 can be performed by an over-the-air loop back through the Ant-1 of the second FEM 402.

Figure 5:
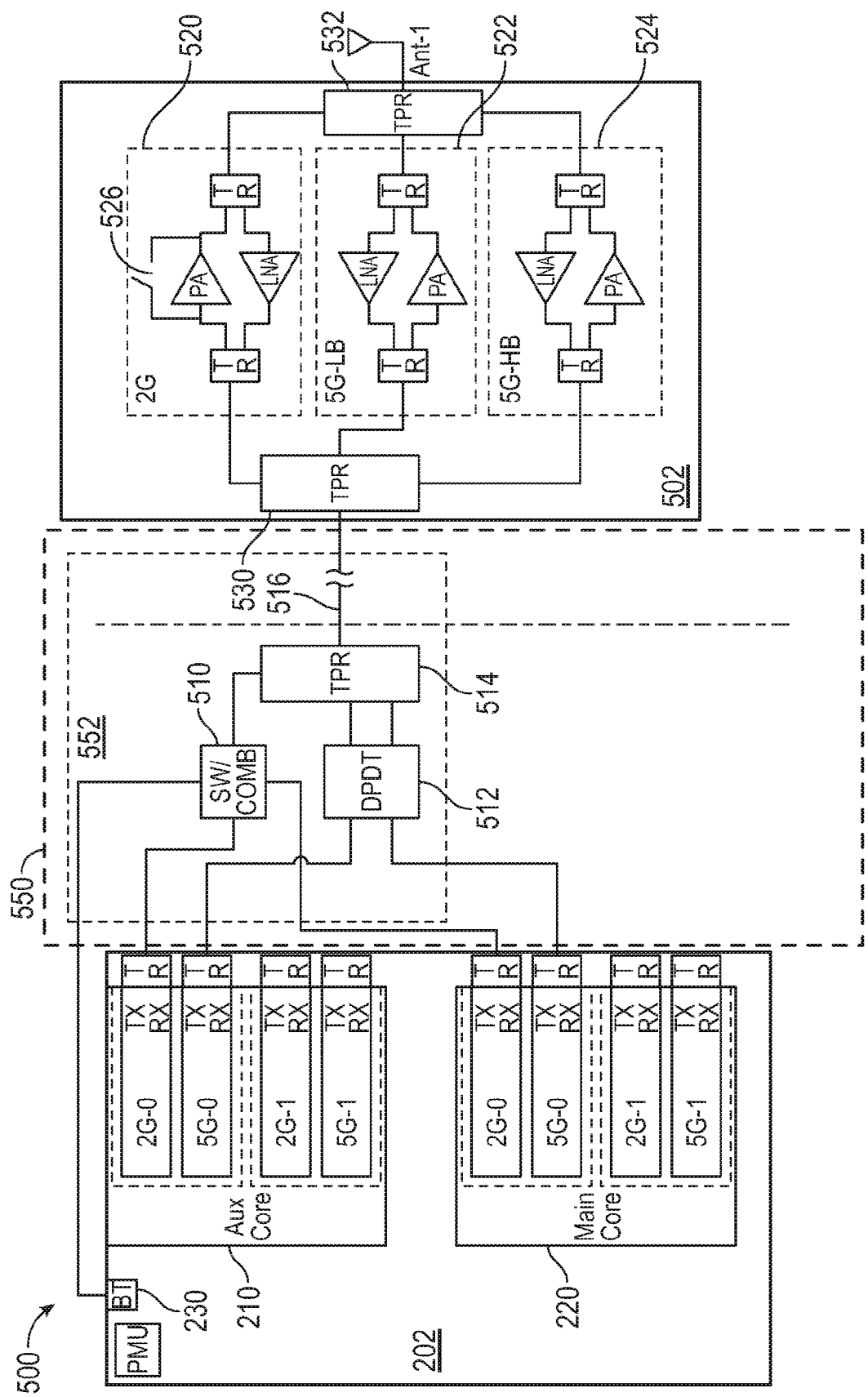
FIG. 5 is a schematic diagram illustrating an example of a wireless communication device with remote FEMs according to aspects of the subject technology.

FIG. 5 is a schematic diagram illustrating an example of a wireless communication device 500 with remote FEMs according to aspects of the subject technology. The wireless communication device 500 includes a radio and baseband circuit 202, a first FEM 502, a first RF antenna Ant-1, an interface circuitry 550. In some implementations, the wireless communication device 500 can further include one or more additional FEMs (e.g., a second FEM) and one or more additional antennas (e.g., a second RF antenna Ant-1) (not shown for simplicity). The radio and baseband circuit 202 is structurally and functionally similar to the radio and baseband circuit 202 of FIG. 4.

The first FEM 502 (and other additional FEMS are placed remote from the SOC (radio and baseband circuit 202) and are coupled to the SOC via the interface circuitry 550. In some implementations, the first FEM 502 includes, but is not limited to, a 2 G FE circuit 520, a first 5 G FE circuit 522, a second 5 G FE circuit 524, a first multiplexer 530 (e.g., a triplexer), and a second multiplexer 532 (e.g., a triplexer). The first 5 G FE circuit 522 and the second 5 G FE circuit 524 can operate at different 5 G channel frequencies. For example, the first 5 G FE circuit 522 can operate at a low-band (LB) 5 G and the second 5 G FE circuit 524 can operate at a high-band (HB) 5 G. In some implementations, the triplexers 530 and 532 can be implemented with BP filters that can direct the 2 G and 5 G signals (e.g., 5 G LB and 5 G HB) to respective 2 G and 5 G ports of each triplexer.

The 2 G FE circuit 520 includes a 2 G LNA, a 2 G PA in its respective RX and TX paths, a first TR switch, a second TR switch, and a bypass switch 526. The first and second TR switches can be implemented as SP2T switches to allow one of the TX or RX paths to be coupled to the first and second multiplexers 530 and 532. In some implementations, a by-pass switch 526 allows bypassing the PA of the 2 G TX path, for example, for low-power BT communication. The first and second 5 G FE circuit 524 and 524 are similar and each include a 5 G LNA, a 5 G PA, and TR switches similar to the first and second TR switches of the 2 G FE circuit 520. In some implementations, the second FEM (not shown for simplicity) is similar to the first FEM 502 described above and is coupled to the RF antenna Ant-0 (not shown for simplicity).

The interface circuitry 550 includes an interface circuit 552 and an interface circuit 452 and can include other similar interface circuits. The interface circuit 552 couples the SOC 202 to the first FEM 502 with reduced number of routings for RF signals. The other interface circuits, not shown herein, can be similar to the interface circuit 552 and similarly couple the SOC 202 to respective other FEMs (e.g., the second FEM).

In one or more implementations, the interface circuit 552 includes a first switch/combiner 510, a second switch (e.g., a DPDT switch) 512, a multiplexer (e.g., a triplexer) 514, and a single interconnect route 516 (e.g., a conductive link such as PCB route or a cable). The first switch/combiner 510, the second switch 512, and the triplexer 514 are placed in close proximity to the SOC 202 and are coupled through the single interconnect route 516 to the first FEM 502. The first switch/combiner 510 couples the BT radio 230, the 2 G radio-0 of the aux core 210 and 2 G radio-0 of the main core 220 to a 2 G port of the triplexer 514. The second switch 512 is 5 G switch circuit that can selectively couple one the 5 G radio-0 of the aux core 210 or the 5 G radio-0 of the main core 220 to one of a LB 5 G port or a HB 5 G port of the triplexer 514. For example, each of the 5 G radio-0 of the aux core 210 or the 5 G radio-0 of the main core 220 can be a LB 5 G or a HB 5 G channel. The triplexer 514 is coupled via the single interconnect route 516 to the triplexer 530 of the FEM 502. The configuration of the interface 552 allows communication of 2 G RF or BT signals simultaneously with both LB and HB 5 G RF signals through Ant-1.

Figure 6:
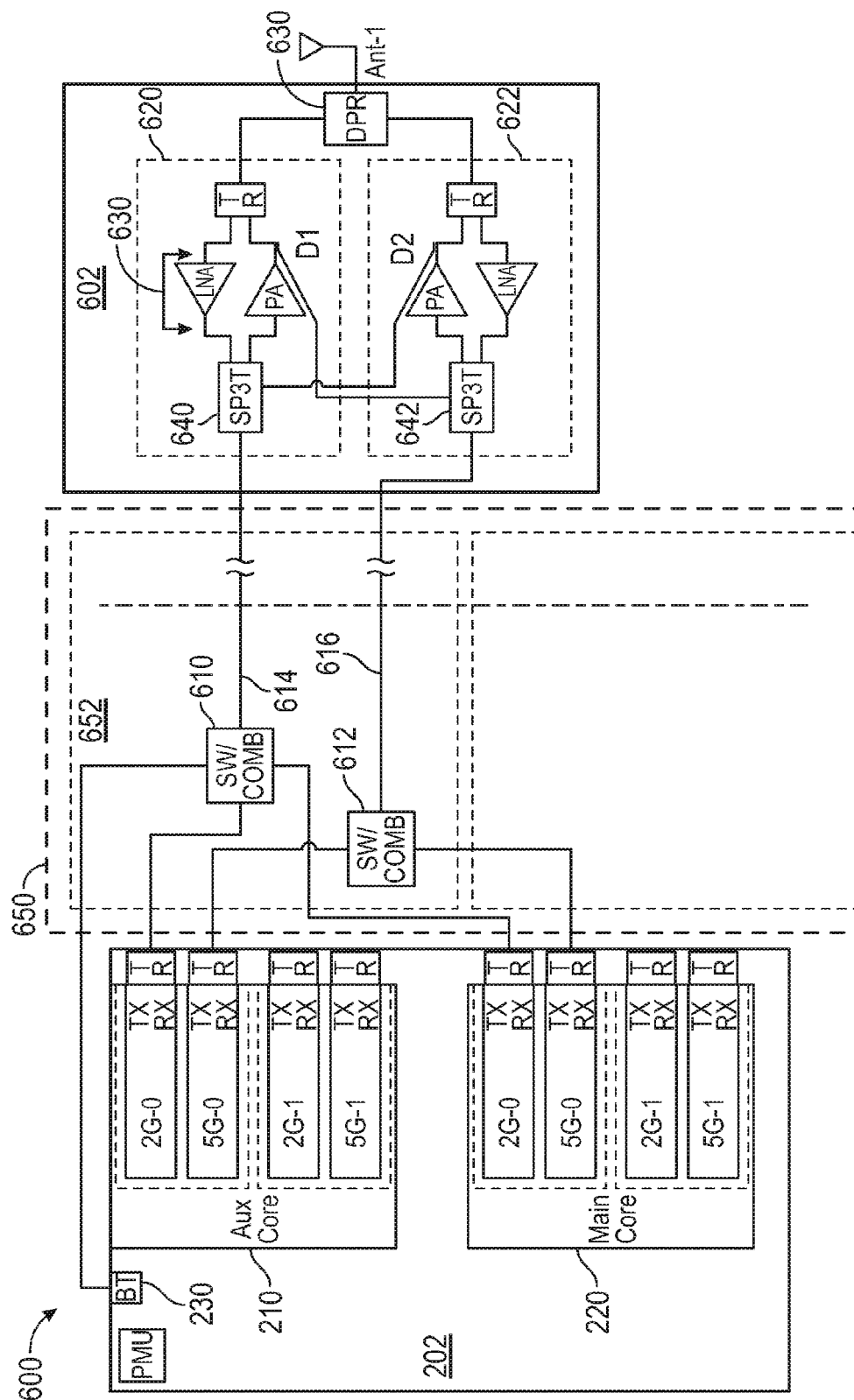
FIG. 6 is a schematic diagram illustrating an example of a wireless communication device with remote FEMs according to aspects of the subject technology.

FIG. 6 is a schematic diagram illustrating an example of a wireless communication device 600 with remote FEMs according to aspects of the subject technology. The wireless communication device 600 includes a radio and baseband circuit 202, a first FEM 602, a first RF antenna Ant-1, and an interface circuitry 650. The wireless communication device 600 can include additional FEMs (e.g., a second FEM) and RF antennas (e.g., a second RF antenna Ant-0), in some implementations. The radio and baseband circuit 202 is structurally and functionally similar to the radio and baseband circuit 202 of FIGS. 4 and 5, as described above.

The FEMs including the first FEM 602 are placed remote from the SOC (radio and baseband circuit 202) and are coupled to the SOC via the interface circuitry 650. In some implementations, the first FEM 602 includes, but is not limited to, a 2 G FE circuit 620, a 5 G FE circuit 622, and a multiplexer 630 (e.g., a diplexer). In some implementations, the diplexers 630 can be implemented with BP filters that can direct the 2 G and 5 G signals to respective 2 G and 5 G ports of each diplexer. The 2 G FE circuit 620 includes a 2 G LNA, a 2 G PA in its respective RX and TX paths, a first switch 640 (e.g., a SP3T switch), and a first TR switch. The 5 G FE circuit 622 includes a 5 G LNA, a 5 G PA in its respective RX and TX paths, a second switch 642 (e.g., a SP3T switch), and a second TR switch. The first and second TR switches can allow one of the TX or RX paths to be coupled to the RF antenna Ant-1. In some implementations, a by-pass path 630 allows bypassing the PA of the 2 G TX path, for example, for low-power BT communication.

The 2 G and 5 G FE circuits 620 and 622 have the additional feature of providing loop-back signals for DPD of their respective PAs. For example, detectors D1 and D2 are coupled to the output nodes of the PAs of the 2 G and 5 G FE circuits and provide 2 G and 5 G loop-back signals to the second and first switches 642 and 640, respectively. During a calibration operation, the 2 G and 5 G loop-back signals are transmitted through the interface circuitry 650 to radio and baseband circuit 202 for processing by the baseband processor (not shown for simplicity).

The interface circuitry 650 includes one or more interface circuits including an interface circuit 652. The interface circuit 652 couples the SOC 202 to the first FEM 602 with reduced number of routings for RF signals. Other interface circuits, not shown, can be similar to the interface circuit 652 and similarly couple the SOC 202 to other FEMs (e.g., the second FEM).

In one or more implementations, the interface circuit 652 includes a first switch/combiner 610, a second switch/combiner 612, and two single interconnect routes 614 and 616 (e.g., conductive links such as PCB routes or a cables). The first switch/combiner 610 and the second switch/combiner 612 are placed in close proximity to the SOC 202 and are coupled through two single interconnect routes 614 and 616 to the first FEM 602. The first switch/combiner 610 couples the BT radio 230, the 2 G radio-0 of the aux core 210, and 2 G radio-0 of the main core 220 to the single interconnect routes 614 for coupling to the first switch 640 of the FEM 602. The second switch/combiner 612 couples the 5 G radio-0 of the aux core 210 and 5 G radio-0 of the main core 220 to the single interconnect routes 616 for coupling to the second switch 642 of the FEM 602. The configuration of the interface 652 allows communication of 2 G RF or BT signals simultaneously with 5 G RF signals through Ant-1.

Similarly, a second interface circuit (not shown for simplicity) can couple the 2 G radio-1 of the aux core 210 and the main core 220 and 5 G radio-1 of the aux core 210 and the main core 220 to a second FEM for communication to a second antenna.

Figure 7:
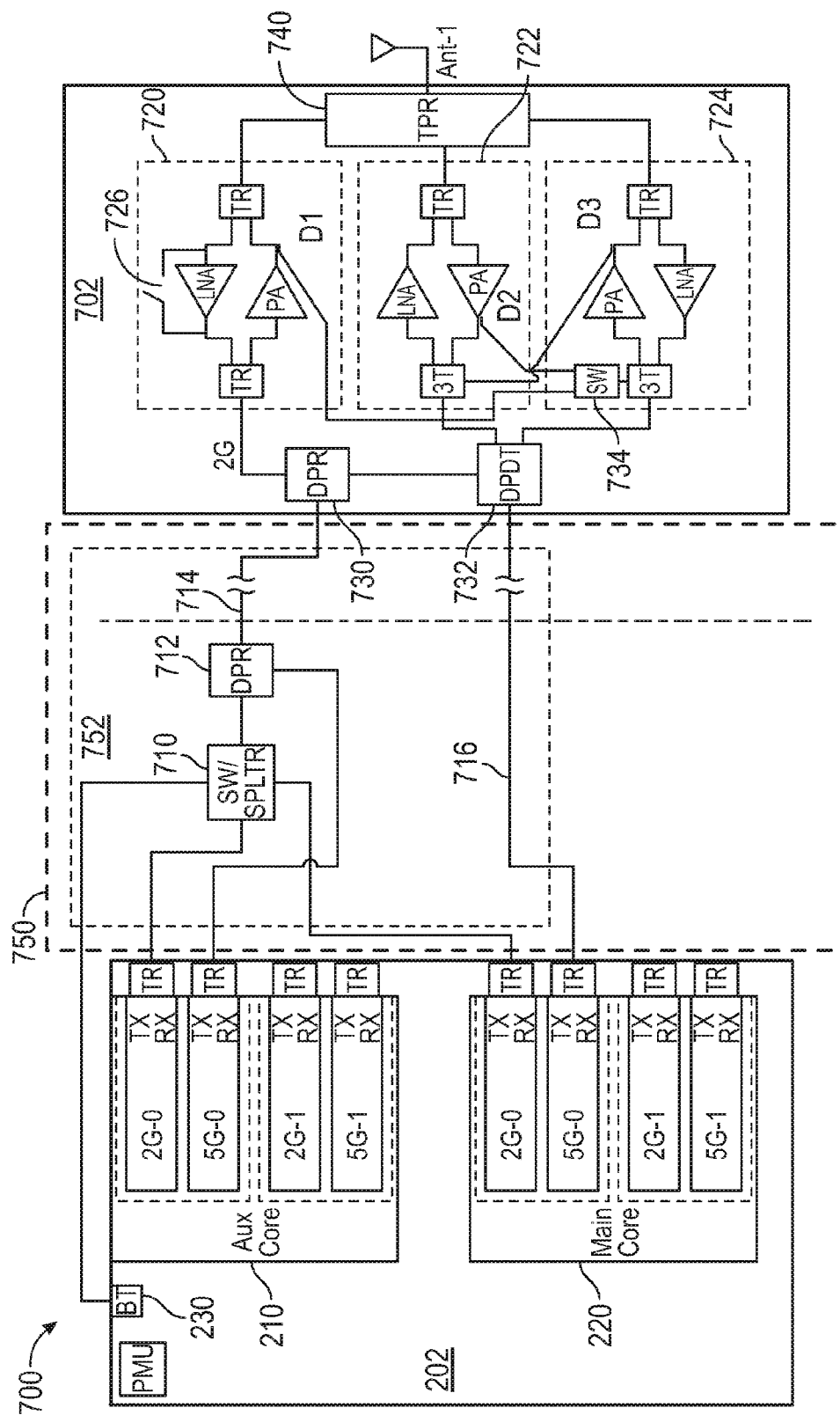
FIG. 7 is a schematic diagram illustrating an example of a wireless communication device with remote FEMs according to aspects of the subject technology.

FIG. 7 is a schematic diagram illustrating an example of a wireless communication device 700 with remote FEMs according to aspects of the subject technology. The wireless communication device 700 includes a radio and baseband circuit 202, a first FEM 702, a first RF antenna Ant-1, and an interface circuitry 750. The wireless communication device 700 can include additional FEMs (e.g., a second FEM) and RF antennas (e.g., a second RF antenna Ant-0), in some implementations. The radio and baseband circuit 202 is structurally and functionally similar to the radio and baseband circuit 202 of FIGS. 4 and 5, as described above.

The FEMs including the first FEM 702 are placed remote from the SOC (radio and baseband circuit 202) and are coupled to the SOC via the interface circuitry 750. In some implementations, the first FEM 702 includes, but is not limited to, a 2 G FE circuit 720, a first 5 G FE circuit 722, a second 5 G FE circuit 724, a first multiplexer 730 (e.g., a diplexer), a switch 732 (e.g., DPDT), and a second multiplexer 740 (e.g., a triplexer). In some implementations, the diplexers 730 and the triplexer 740 can be implemented with BP filters that can direct the 2 G and 5 G signals to respective 2 G and 5 G ports of the diplexers 730 and the triplexer 740. The 2 G FE circuit 720 includes a 2 G LNA, a 2 G PA in its respective receive (RX) and transmit (TX) paths, and a first and second TR switch. Each of the first and second 5 G FE circuit 722 and 724 includes a 5 G LNA, a 5 G PA in its respective receive (RX) and transmit (TX) paths, a 3T switch (e.g., a SP3T switch), and a TR switch. The TR switches can allow one of the TX or RX paths to be coupled through the triplexer 740 to the RF antenna Ant-1. In some implementations, a by-pass path 726 allows bypassing the PA of the 2 G TX path, for example, for low-power BT communication.

The 2 G and 5 G FE circuits 720, 722, and 724 have the additional features of providing loop-back signals for DPD of their respective PAs. For example, detectors D1, D2, and D3 are coupled to the output nodes of the PAs of the 2 G and 5 G FE circuits and provide 2 G and 5 G loop-back signals. The detectors D1 and D2 provide loop-back signals to a switch 734 of the second 5 G FE circuit 724 that is coupled to the 3T switch of the second 5 G FE circuit 724. The detector D3 provides a loop-back signal to the 3T switch of the first 5 G FE circuit 722.

The diplexers 730 couples the TR switch of the 2 G FE circuit and a first port of the DPDT switch 732 to the interface circuitry 750. A second and a third port of the DPDT switch 732 are coupled, respectively, to the 3T switch of the first 5 G FE circuit 722 and the 3T switch of the second 5 G FE circuit 724. A fourth port of the DPDT switch 732 is coupled to the interface circuitry 750. The configuration of the first FEM 702 allows 2 G RF or BT operations simultaneously with LB and HB 5 G RF. In some implementations, one of the first 5 G FE circuit 722 or the second 5 G FE circuit 724 can operate at LB 5 G and the other at HB 5 G. For example, the first 5 G FE circuit 722 can operate at LB 5 G and the second 5 G FE circuit 724 can operate at HB 5 G. During a calibration operation, the 2 G and 5 G loop-back signals are transmitted through the DPDT switch 732 and the interface circuitry 750 to radio and baseband circuit 202 for processing by the baseband processor.

The interface circuitry 750 includes one or more interface circuits including an interface circuit 752. The interface circuit 752 couples the SOC 202 to the first FEM 702 with reduced number of routings for RF signals. Other interface circuits, not shown, can be similar to the interface circuit 752 and similarly couple the SOC 202 to other FEMs (e.g., the second FEM).

In one or more implementations, the interface circuit 752 includes a switch/combiner 710, a diplexer 712, and two single interconnect routes 614 and 616 (e.g., conductive links such as PCB routes or a cables). The first switch/combiner 710 and the diplexer 712 are placed in close proximity to the SOC 202 and are coupled through two single interconnect routes 714 and 716 to the first FEM 602. The first switch/combiner 710 couples the BT radio 230, the 2 G radio-0 of the aux core 210, and the 2 G radio-0 of the main core 220 to a first port of the diplexer 712. The second port of the diplexer 712 is coupled to the 5 G radio-0 of the aux core 210. A third port of the diplexer 712 is coupled to the single interconnect route 714 for coupling to the diplexers 730 of the FEM 702. The 5 G radio-0 of the main core 220 is directly coupled to the single interconnect routes 716 for coupling to the DPDT switch 732 of the FEM 702. The configuration of the interface 752 allows communication of 2 G RF or BT signals simultaneously with LB and HB 5 G RF through Ant-1. For example, any one of the 5 G radio-0 of the aux core 210 or the main core 220 can operate at the LB 5 G or HB 5 G.

Similarly, a second interface circuit (not shown for simplicity) can couple the 2 G radio-1 of the aux core 210 and the main core 220 and 5 G radio-1 of the aux core 210 and the main core 220 to a second FEM for communication to a second antenna.

Figure 8:
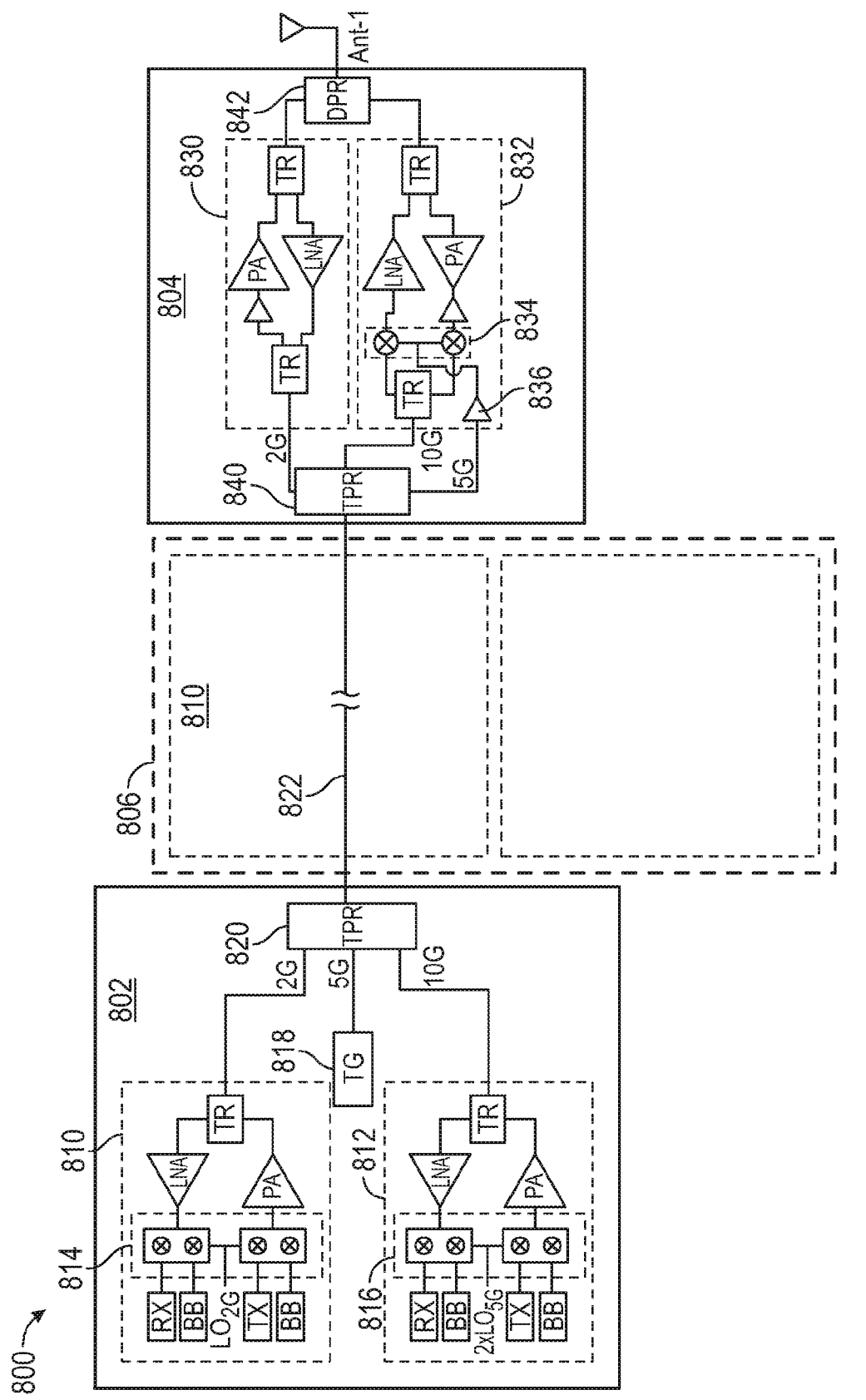
FIG. 8 is a schematic diagram illustrating an example of a wireless communication device with remote FEMs according to aspects of the subject technology.

FIG. 8 is a schematic diagram illustrating an example of a wireless communication device with remote FEMs according to aspects of the subject technology. The wireless communication device 800 includes a radio and baseband circuit 802 (e.g., a SOC), a first FEM 804, a first RF antenna Ant-1, and an interface circuitry 806. The wireless communication device 800 can include additional FEMs (e.g., a second FEM) and RF antennas (e.g., a second RF antenna Ant-0), in some implementations.

The radio and baseband circuit 802 includes a 2 G radio circuit 810, a 10.8 GHz (10 G) radio circuit 812, a tone generator (TG) 818, and a multiplexer (e.g., triplexer) 820.

The 2 G radio circuit 810 includes a first TR switch, a 2 G LNA, a 2 G PA, and a 2 G mixer 814. In some implementations, the 2 G mixer 814 is an inphase-quadrature (I-Q) quad-mixer and receives a 2 G local oscillator (LO). The mixer 814 can down-convert RX RF signals received from the 2 G LNA (e.g., baseband) and up-convert TX RF and BB signals for amplification by the 2 G PA. The 10 G radio circuit 812 includes a second TR switch, a 10 G LNA, a 10 G PA, and a 10 G mixer 816. In some implementations, the 10 G mixer 816 is an I-Q quad-mixer and receives a 10 G LO (e.g., 2×5 G LO). The mixer 816 can down-convert RX RF signals received from the 10 G LNA (e.g., to baseband) and up-convert TX RF and BB signals for amplification by the 10 G PA. The tone generator 818 can generate a 5 G tone. The triplexer 820 couples the 2 G radio circuit 810, the 10 G radio circuit 812, and the tone generator 818 to the interface circuitry 806. In some implementations, the triplexer 820 can be realized by using three BP filters (e.g., for 2 G, 5 G, and 10 G frequencies).

The FEMs including the first FEM 804 are placed remote from the SOC (radio and baseband circuit 802) and are coupled to the SOC via the interface circuitry 806. In some implementations, the first FEM 804 includes, but is not limited to, a 2 G FE circuit 830, a 5 G FE circuit 832, a first multiplexer 840 (e.g., a triplexer), and a second multiplexer 842 (e.g., a diplexer). In some implementations, the triplexers 840 and the diplexer 842 can be implemented with BP filters that can direct the 2 G and 5 G signals to respective 2 G and 5 G ports of the triplexers 840 and the diplexer 842. The 2 G FE circuit 830 includes a 2 G LNA, a 2 G PA in its respective receive (RX) and TX paths, and a first and second 2 G TR switch. In some embodiments, the TX path of the 2 G FE circuit 830 can include a driver DR (e.g., a buffer and/or amplifier) in front of the 2 G PA to provide further isolation and/or amplification for the 2 G PA. The first and second 2 G TR switches can allow one of the TX or RX paths to be coupled through the triplexer 840 to the interface circuitry 806 and through in diplexer 842 to the RF antenna Ant-1.

The 5 G FE circuit 832 includes a 5 G LNA, a 5 G PA, and a 5 G PA driver in its respective RX and TX paths, a 10 G TR switch, a 5 G TR switch, and a mixer. The 10 G TR switch can allow one of the TX or RX paths to be coupled through the triplexer 840 to the interface circuitry 806. The 5 G TR switch can allow one of the TX or RX paths to be coupled through in diplexer 842 to the RF antenna Ant-1. The mixer uses a 5 G LO signal to up convert RX RF signals (e.g., 5 G RF signals) of the RX path and down convert the TX RF signals (e.g., from 10 G to 5 G) of the TX path. In some implementations, the 5 G LO signal of the mixer is the 5 G tone received from a 5 G port of the triplexer 840 and amplified and/or buffered by a buffer 836.

The interface circuitry 805 includes one or more interface circuits including an interface circuit 810. The interface circuit 810 includes a single interconnect 822 (e.g., conductive links such as PCB routes or a cable) and couples the SOC 802 to the first FEM 804. Other interface circuits, not shown, can be similar to the interface circuit 810 and similarly couple the SOC 802 to other FEMs (e.g., the second FEM). The configuration of the communication device 800 allows simultaneous operation of the 2 G and 5 G RF communication.

Figure 9:
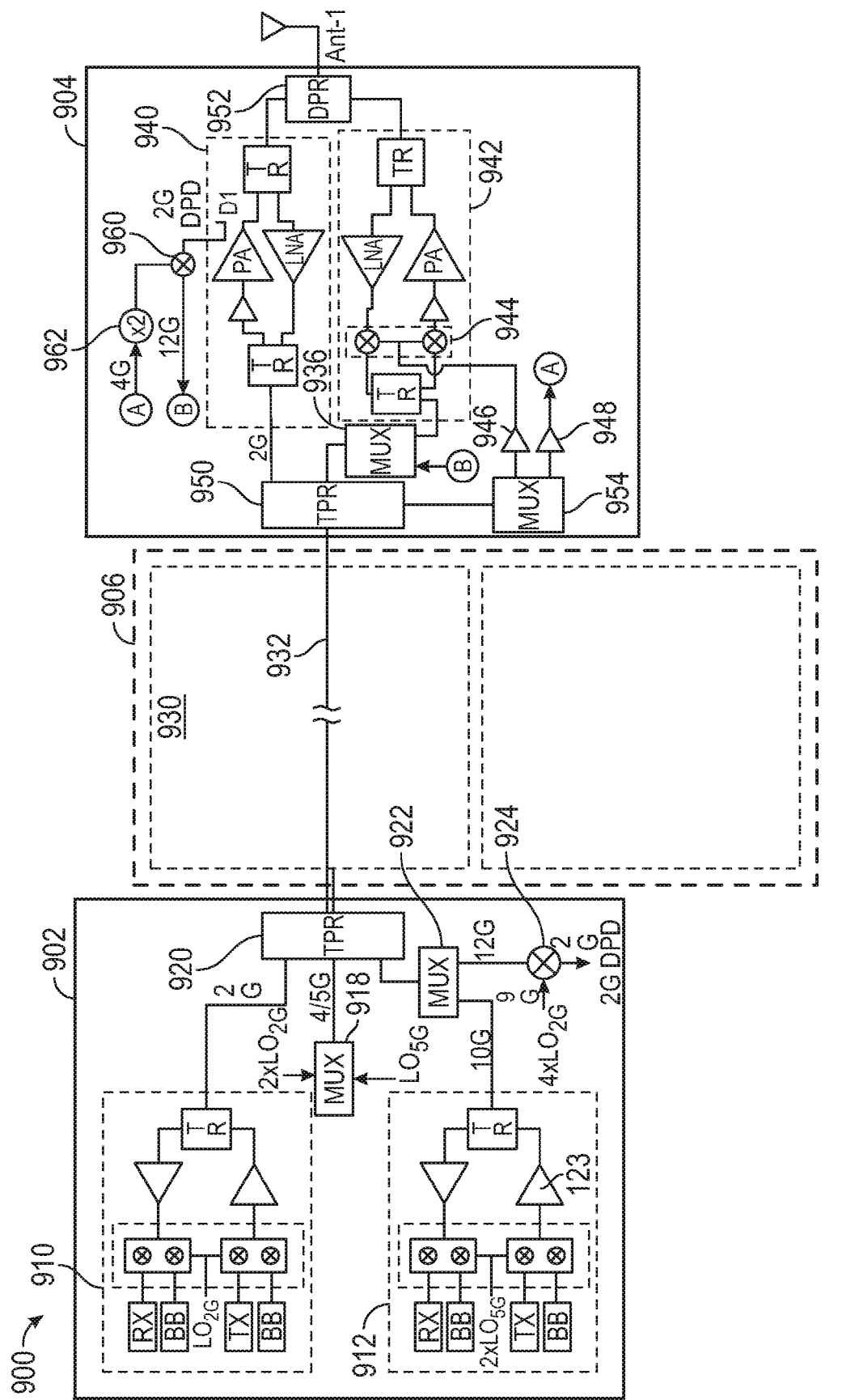
FIG. 9 is a schematic diagram illustrating an example of a wireless communication device with remote FEMs according to aspects of the subject technology.

FIG. 9 is a schematic diagram illustrating an example of a wireless communication device with remote FEMs according to aspects of the subject technology. The wireless communication device 900 includes a radio and baseband circuit 902 (e.g., a SOC), a first FEM 904, a first RF antenna Ant-1, and an interface circuitry 906. The wireless communication device 900 can include additional FEMs (e.g., a second FEM) and RF antennas (e.g., a second RF antenna Ant-0), in some implementations.

The radio and baseband circuit 902 includes a 2 G radio circuit 910, a 10 G radio circuit 912, a first multiplexer (MUX) 918, a second MUX 922, a triplexer 920, and a mixer 924. The 2 G radio circuit 910 and the 10 G radio circuit 912 are similar to the 2 G radio circuit 810 and the 10 G radio circuit 812 of FIG. 8. The MUX 918 receives a 4.8 GHz (4 G) LO at a first port and a 5 G LO at a second port and selectively couples the first or the second port to a third port coupled a second port of the triplexer 920. A first port of the MUX 922 is coupled to 10 G radio circuit 912 and a second port of the MUX 922 is coupled to the mixer 924. The mixer 924 mixes a 9.6 GHz (9 G) LO (e.g., provided by 4x 2 G LO) and a 12 GHz (12 G) signal received from the second port of the MUX 922 to generate a 2 G loop-back signal. The 2 G loop-back signal is sent to the BB to be used for DPD of a 2 G PA of the FEM 904. The third port of the MUX 922 is coupled to the third port of the triplexer 920. The first port of the triplexer 920 is coupled to the 2 G radio circuit 910. The triplexer 920 can be implemented using BP filters (e.g., for 2 G, 4G/5 G, and 10 10 G/12 G frequencies). The fourth port of the triplexer 920 is coupled to the interface circuitry 906 and allows communication of the 2 G, 5 G/4G, and 10 G/12 G signals to and from the first FEM 904.

The FEMs including the first FEM 904 are placed remote from the SOC (radio and baseband circuit 902) and are coupled to the SOC via the interface circuitry 906. In some implementations, the first FEM 904 includes, but is not limited to, a 2 G FE circuit 940, a 5 G FE circuit 942, a first multiplexer 950 (e.g., a triplexer), a second multiplexer 952 (e.g., a diplexer), a mixer 960, and a frequency multiplier 962, a first MUX 936, a second MUX 954, and buffers 946 and 948. In some implementations, the triplexers 950 and the diplexer 952 can be implemented with BP filters with suitable frequencies. For example, for triplexers 950 BP filters for 2 G, 45/5 G, and 10 G/12 G frequencies are used. The 2 G FE circuit 940 includes a 2 G LNA, a 2 G PA in its respective receive (RX) and TX paths, and a first and second 2 G TR switch. In some embodiments, the TX path of the 2 G FE circuit 830 can include a driver DR (e.g., a buffer and/or amplifier) in front of the 2 G PA to provide further isolation and/or amplification for the 2 G PA. The first and second 2 G TR switches can allow one of the TX or RX paths to be coupled through the triplexer 950 to the interface circuitry 906 and through the diplexer 952 to the RF antenna Ant-1.

The 5 G FE circuit 942 includes a 5 G LNA, a 5 G PA, and a 5 G PA driver in its respective RX and TX paths, a 10 G TR switch, a 5 G TR switch, and a mixer. The 10 G TR switch can allow one of the TX or RX paths to be coupled through the MUX 936 and the triplexer 950 to the interface circuitry 906. The 5 G TR switch can allow one of the TX or RX paths to be coupled through the diplexer 952 to the RF antenna Ant-1. The mixer uses a 5 G LO signal to up convert RX RF signals (e.g., 5 G RF signals) of the RX path and down convert the TX RF signals (e.g., from 10 G to 5 G) of the TX path. In some implementations, the 5 G LO signal of the mixer is the 5 G tone received from a 5 G port of the triplexer 950 through a first port (5 G LO) of the second MUX 954 and amplified and/or buffered by a buffer 946. The second port (4G port) of the MUX 954 is coupled through the buffer 948 to point A, which is coupled to the frequency multiplier 962. The third port of the MUX 954 is coupled to a 4G/5 G port of the triplexer 950. A first port of the MUX 936 is coupled to the first TR switch of the 5 G FE circuit 942. The second port (12 G port) of the MUX 936 is coupled through point B to the mixer 960. The third port of the MUX 936 is coupled to a 10 G/12 G port of the triplexer 950. The mixer 960 receives a DPD loop-back signal from a detector D1 coupled to an output port of the 2 G PA of the 2 G FE circuit 940. The mixer 960 receives a 9.6 GHz (9 G) signal from the frequency multiplier 962 and mixes the 9G signal with the 2 G DPD loop-back signal to generate a 12 G signal. The 12 G signal is transmitted through the first MUX 936 and the triplexer 950 to the interface circuitry 906, and through the interface 906 to the SOC 902, where it is directed to the mixer 924 and used for DPD of the 2 G PA, as explained above.

The interface circuitry 906 includes one or more interface circuits including an interface circuit 930. The interface circuit 930 includes a single interconnect 932 (e.g., conductive links such as PCB routes or a cable) and couples the SOC 902 to the first FEM 904. Other interface circuits, not shown, can be similar to the interface circuitry 906 and similarly couple the SOC 902 to other FEMs (e.g., the second FEM). The configuration of the communication device 900 allows simultaneous operation of the 2 G and 5 G RF communication and provides DPD loop-back for the 2 G PA of the 2 G FE circuit 940.

Figure 10:
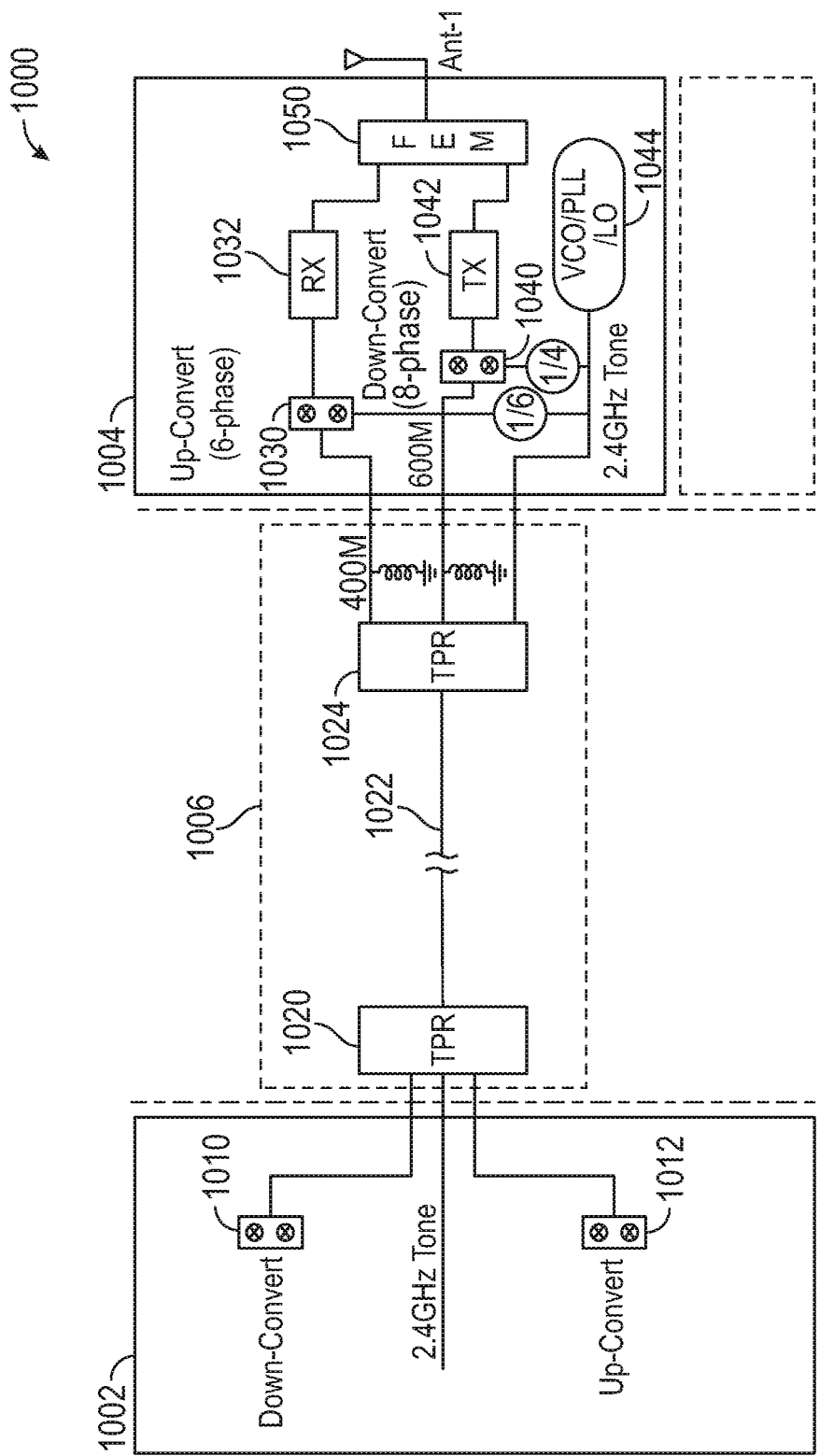
FIG. 10 is a schematic diagram illustrating an example of a wireless communication device with remote FEMs according to aspects of the subject technology.

FIG. 10 is a schematic diagram illustrating an example of a wireless communication device 1000 with remote FEMs according to aspects of the subject technology. The wireless communication device 1000 includes a radio and baseband circuit 1002 (e.g., a SOC), a first remote circuit 1004, a first RF antenna Ant-1, and an interface circuitry 1006. The wireless communication device 1000 can include additional remote circuits and RF antennas, in some implementations.

The radio and baseband circuit 1002 includes, but is not limited to, down-converter mixer 1010 and an up-converter mixer 1012 and receives a 2 G tone signal from the first remote circuit 1004 through the interface circuitry 1006. In some implementations, the mixers 1010 and 1012 can use fractions of the 2 G tone signal to generate suitable LO signals. The down-converter mixer 1010 down-converts from a first intermediate frequency (IF) (e.g., 400 MHz) signal to baseband, and the up-converter mixer 1012 up-converts from baseband to a second IF (e.g., 600 MHz) signal.

The first remote circuit 1004 includes a FEM 1050, an RX circuit 1032 a first mixer 1030, a TX circuit 1042, a second mixer 1040, and a VCO/PLL 1044. In some implementations, the first mixer 1030 is a poly-phase (e.g., 6-phase) up-converter mixer and the second mixer 1040 is a poly-phase (e.g., 8-phase) down-converter mixer. The VCO/PLL 1044 generate a 2.4 GHz tone, of which lower frequency tones (e.g., ⅙ and ¼) are use as LO for the first mixer 1030 and the second mixer 1040. The FEM 1050 is 2 G FEM including a 2 G LNA and a 2 G PA. The IF signals of the first mixer 1030 and the second mixer 1040 are at 400 MHz and 600 MHZ, respectively.

The interface circuit 1006 includes a first multiplexer (e.g., a triplexer) 1020, a second multiplexer (e.g., a triplexer) 1024, and a single interconnect 1022 (e.g., conductive links such as PCB routes or a cable) and couples the SOC 1002 to the first remote circuit 1004. The first, second, and third ports of the triplexer 1020 are coupled, respectively, to the down-converter mixer 1010, the up-converter mixer 1012, and to a 2 G tone line of the radio and baseband circuit 1002. The first, second, and third ports of the triplexer 1024 are coupled, respectively, to the 400 MHz IF, the 600 MHz IF, and the 2.4 GHz tone of the first remote circuit 1004. The fourth ports of the first triplexer 1020 and the second triplexer 1024 are coupled together via the single interconnect 1022. One of the advantageous features of the communication device 1000 is that the signals carried over the single interconnect 1022 are IF signals (e.g., 400 MHz IF, and 600 MHz IF), instead of the 2 G signals, which are significantly less demanding on the single interconnect 1022 in terms of insertion loss.

Figure 11:
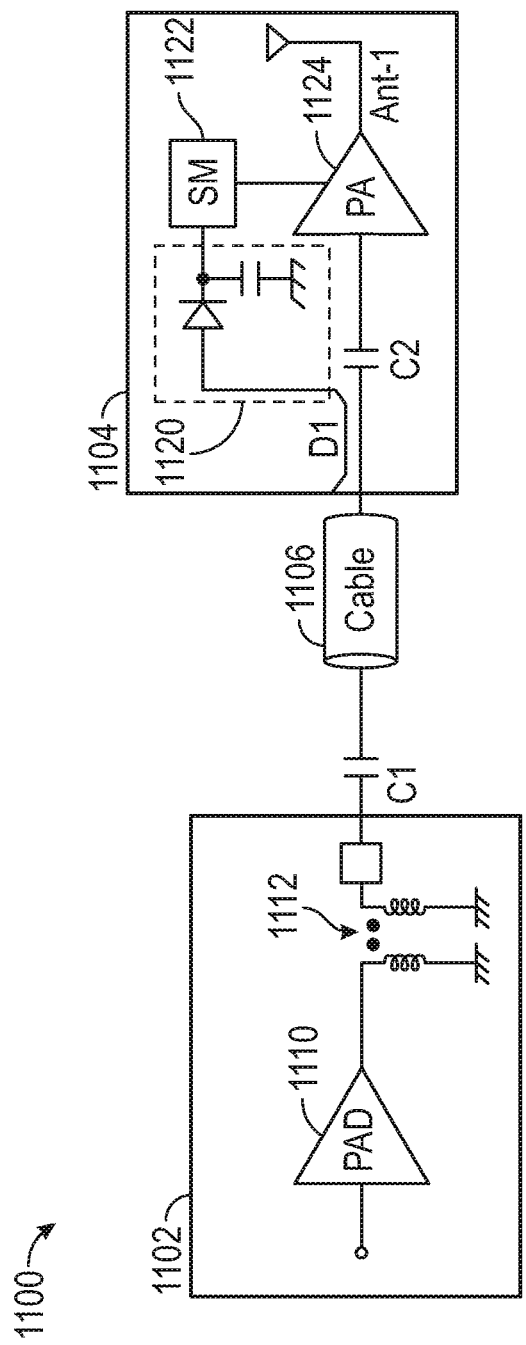
FIG. 11 is a schematic diagram illustrating an example of an envelope tracker (ET) circuit of a wireless communication device with remote FEMs according to aspects of the subject technology.

FIG. 11 is a schematic diagram illustrating an example of an envelope tracker (ET) circuit 1100 of a wireless communication device with remote FEMs according to aspects of the subject technology. The ET circuit 1100 includes a first circuit 1102 and an FEM 1104. The first circuit 1102 is a radio and baseband circuit, as discussed above (e.g., SOC 802 of FIG. 8), of which only ET-relevant circuits are shown and discussed herein. The FEM 1104 is a remote FEM, as discussed above (e.g., FEM 804 of FIG. 8), of which only ET-relevant circuits are shown and discussed herein. The ET circuit 1100 is coupled to the FEM 1104 via a single interconnect 1106 (e.g., conductive links such as PCB routes or a cable) and a capacitor C1. The first circuit 1102 includes a PA driver (PAD) 1110 and a coupled-pair of inductors 1112.

It is understood that the envelope of the RF signal is traditionally generated in the SOC and is sent to the FEM. This scheme can have some advantages, as it allows digital processing of the envelope signal such as shaping, delaying, and other processing. The disadvantage of this scheme, as traditionally implemented, is that a separate interconnect 1106 is needed to transmit the envelope signal from the SOC to the FEM. In the subject disclosure, embodiments are discussed in which the envelope of the RF signal is either generated in the Remote FEM, as in the FEM 1104, or generated in the SOC and transmitted to the remote FEM using the same interface circuitry that is used for the RF signal, as discussed with respect to the embodiments of FIGS. 12-14 below.

Returning to FEM 1104, the ET-relevant circuits include a detector D1 (e.g., a coupler), an envelope generator 1120, a supply modulator (SM) 1122, a PA 1124 and an RF antenna Ant-1. The detector D1 provides an RF signal, based on the input signal to PA, to the envelope generator 1120. The envelope generator 1120 is a known circuit including a diode D and a capacitor C coupled to the ground and can derive the envelope of the RF signal. The envelope signal generated by the envelope generator 1120 is supplied to the SM 1122, which controls the bias supply to the PA 1124 based on the envelope signal.

Figure 12:
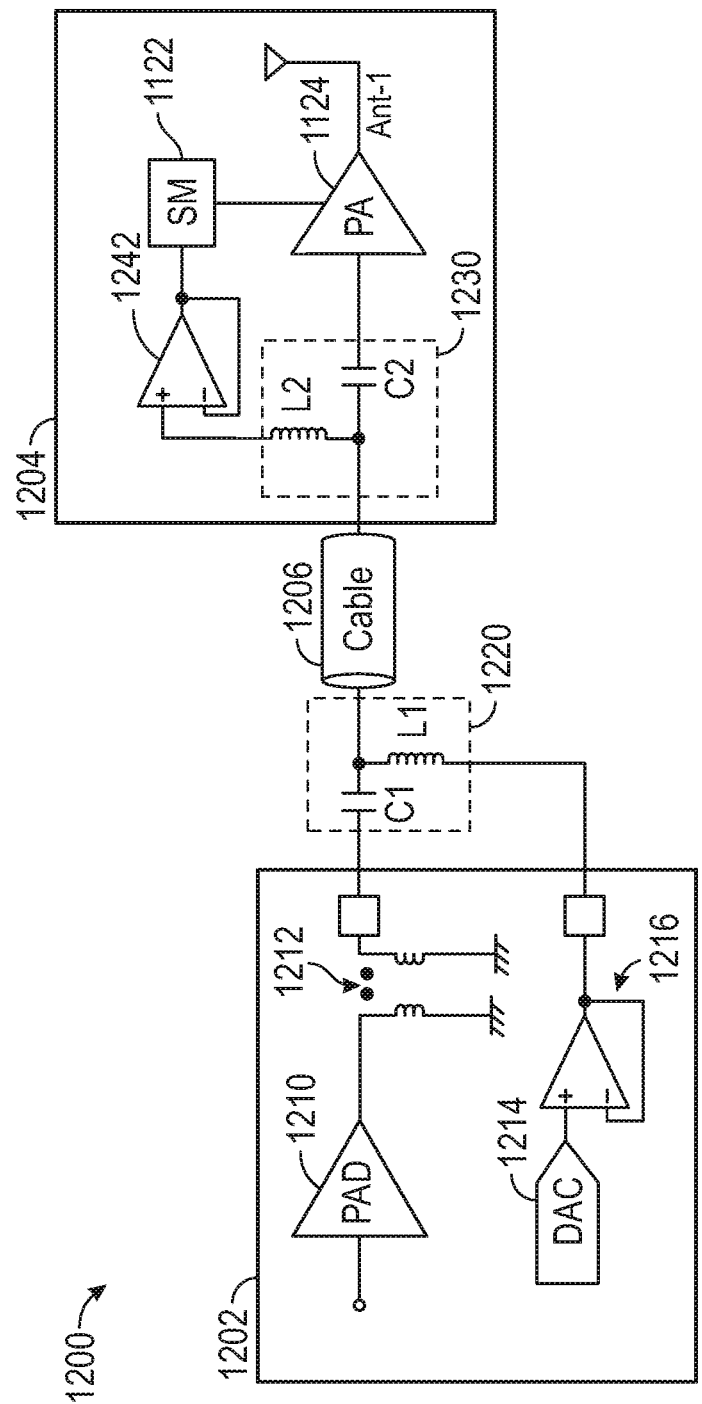
FIG. 12 is a schematic diagram illustrating an example of an ET circuit of a wireless communication device with remote FEMs according to aspects of the subject technology.

FIG. 12 is a schematic diagram illustrating an example of an ET circuit 1200 of a wireless communication device with remote FEMs according to aspects of the subject technology. The ET circuit 1202 includes a first circuit 1202 and an FEM 1204. The first circuit 1202 is a radio and baseband circuit, as discussed above (e.g., SOC 802 of FIG. 8), of which only ET-relevant circuits are shown and discussed herein. The FEM 1204 is a remote FEM, as discussed above (e.g., FEM 804 of FIG. 8), of which only ET-relevant circuits are shown and discussed herein. The ET circuit 1200 is coupled to the FEM 1204 via a single interconnect 1206 (e.g., conductive links such as PCB routes or a cable) and a diplexer circuit 1220. The diplexer circuit 1220 provides an RF path and a baseband path for the RF signal and the envelope signal between the first circuit 1202 and the single interconnect route 1206.

The first circuit 1202 includes a PAD 1210, a coupled-pair of inductors 1212, a digital-to-analog converter (DAC)

1214, and a buffer 1216. The DAC 1214 converts the digital envelope signal generated by the baseband into an analog envelope signal which is provided to the diplexer circuit 1220 after passing through the buffer 1216. The diplexer circuit 1220 include a capacitor C1 and an inductor L1, which can filter the envelope and RF signals, respectively. In other words, the capacitor C1 is almost open circuit for envelope signal and almost short circuit for the RF signal, and the inductor L1 is almost short circuit for envelope signal and almost open circuit for the RF signal.

The ET-relevant circuits of the FEM 1204 are similar to the FEM 1104 of FIG. 11, except that the detector D1, the capacitor C2, and the envelope generator 1120 are replaced with an extractor circuit 1230 and a buffer 1242. The extractor circuit 1230 is a diplexer formed by an inductor L2 and the capacitor C2, which allows the RF signal to pass to and prevents the envelope signal from entering the PA 1124. The inductor L2, on the other hand, allows the envelope signal to pass to and prevents the RF signal from entering the buffer 1242. Thus, the envelope signal generated in the baseband and carried over the same interconnect 1206 along with the RF signal can be used by the SM 1122 to adjust the output power of the PA 1124.

Figure 13:
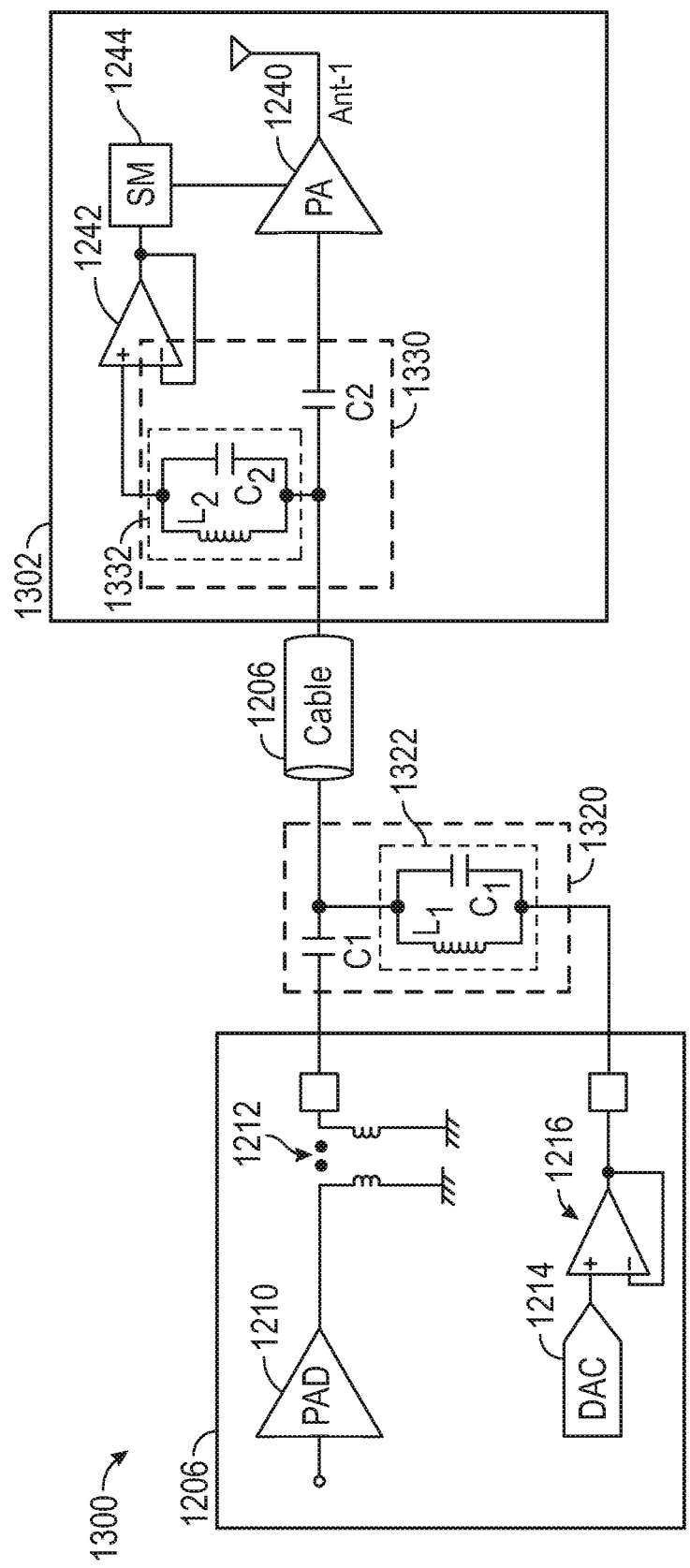
FIG. 13 is a schematic diagram illustrating an example of an ET circuit of a wireless communication device with remote FEMs according to aspects of the subject technology.

FIG. 13 is a schematic diagram illustrating an example of an ET circuit 1300 of a wireless communication device with remote FEMs according to aspects of the subject technology. The ET circuit 1300 is similar to the ET circuit 1200 of FIG. 12, except for improvements in the diplexer circuit 1320 and the extract circuit 1332, as discussed herein. In the diplexer circuit 1320 and the extract circuit 1332, the L1 and L2 inductors are replaced with LC tank circuits 1322 and 1332, respectively. The replacements clearly makes the diplexer circuit 1320 and the extract circuit 1332 more effective, as the resonance frequencies $\omega_1=1/(L_1C_1)^{1/2}$ and $\omega_2=1/(L_2C_2)^{1/2}$ are chosen to be almost equal to the frequency of the RF signal to trap the RF signal while allowing the envelope signal to pass through the tanks circuits 1322 and 1332.

Figure 14:
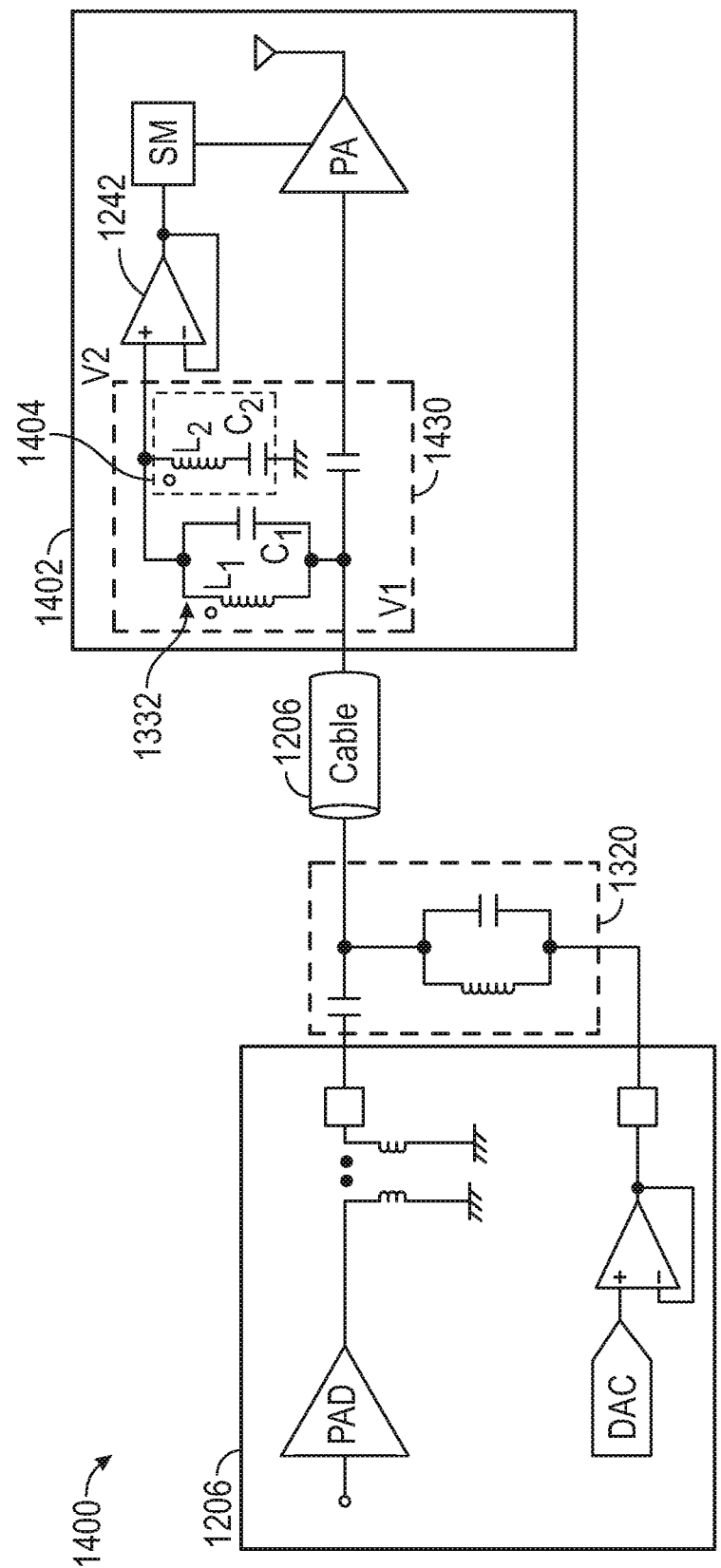
FIG. 14 is a schematic diagram illustrating an example of an ET circuit of a wireless communication device with remote FEMs according to aspects of the subject technology.

FIG. 14 is a schematic diagram illustrating an example of an ET circuit 1400 of a wireless communication device with remote FEMs according to aspects of the subject technology. The ET circuit 1400 is similar to the ET circuit 1300 of FIG. 13, except for improvements in the extract circuit 1430, as discussed herein. The difference between the extract circuit 1430 and the extract circuit 1330 of FIG. 13 is the addition of a series LC tank 1404 between the input of the buffer 1242 and the ground potential. It is known that for the parallel LC tank, $Q1=R_1(C_1/L_1)^{1/2}$ and for the series LC tank, $Q2=R_2(L_2/C_2)^{1/2}$, where $R_1$, and R2 are resistances associated with the inductors $L_1$ and $L_2$, respectively. Accordingly, wide-band attenuation (small Q) by the tank circuit 1404 can be achieved by suitably increasing the value of $L_1$ and/or decreasing the value $L_2$. Further, it can be shown that the absolute values of attenuation ($=V_2/V_1$) of the extract circuit 1430 for an RF signal with frequency $\omega_0=\omega_1=\omega_2$ can be maximized by choosing values of $L_1$ to be smaller than $L_2$.

Figure 15:
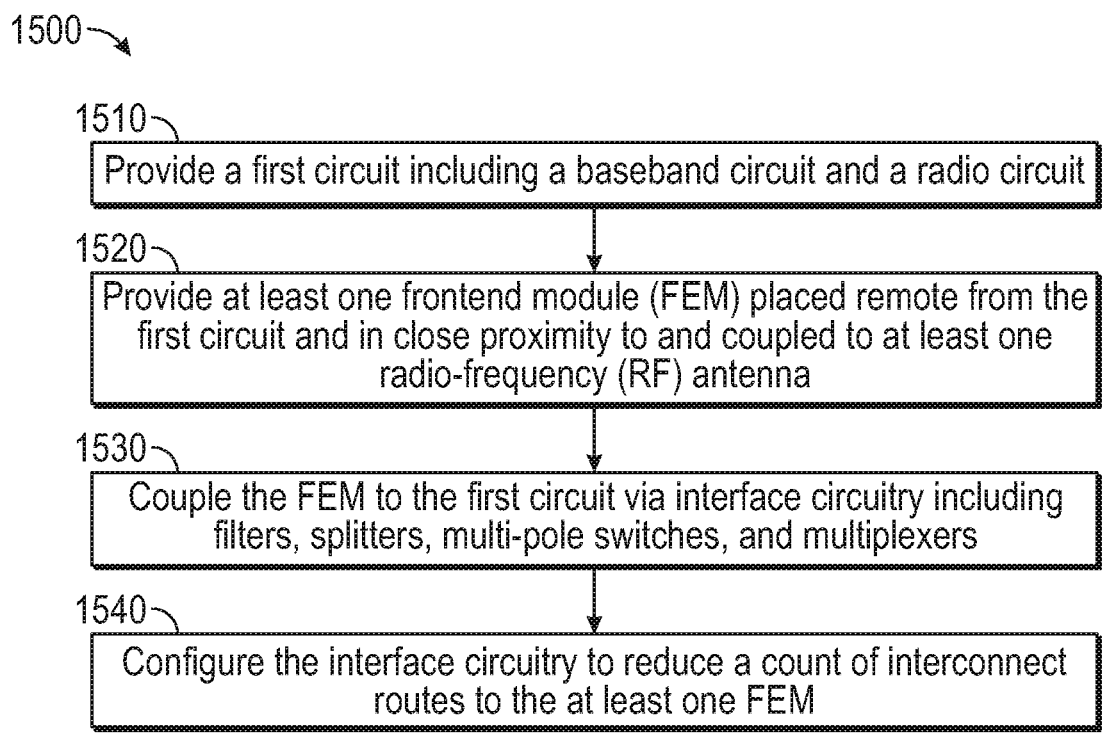
FIG. 15 is flow diagram illustrating a method of providing a wireless communication device with remote FEMs according to aspects of the subject technology.

FIG. 15 is flow diagram illustrating a method 1500 of providing a wireless communication device (e.g., 400 of FIG. 4) with remote FEMs (e.g., 402 and 404 of FIG. 4) according to aspects of the subject technology. The method 1500 begins with providing a first circuit (e.g., 202 of FIG. 4) including a baseband circuit and a radio circuit (1510). At least one FEM (e.g., 402 of FIG. 4) is provided and placed remote from the first circuit and in close proximity to and coupled to at least one RF antenna (e.g., Ant-1 of FIG. 4) (1520). The FEM is coupled to the first circuit via interface circuitry (e.g., 450 of FIG. 4) including filters (e.g., 314 of FIG. 3), splitters (2.g., 330 of FIG. 3), multi-pole switches (e.g., 410 of FIG. 4), and multiplexers (e.g., 412 of FIG. 4) (1530). The interface circuitry is to reduce a count of interconnect routes to the at least one FEM (1540).

Figure 16:
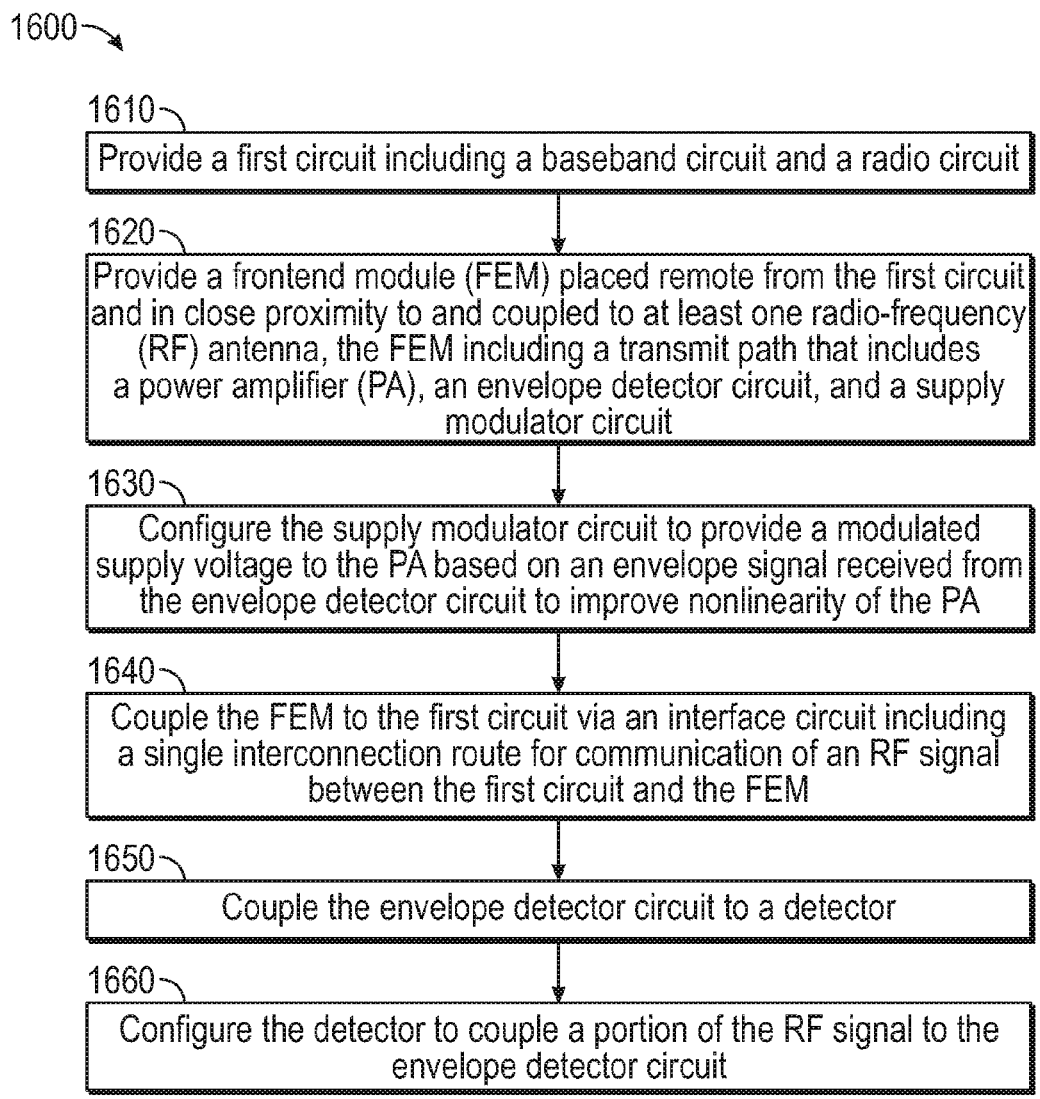
FIG. 16 is flow diagram illustrating a method of providing a wireless communication device with remote FEMs and including an ET circuit according to aspects of the subject technology.

FIG. 16 is flow diagram illustrating a method 1600 of providing a wireless communication device (e.g., 1100 of FIG. 11) with remote FEMs (e.g., 1104 of FIG. 11) and including an ET circuit according to aspects of the subject technology. The method 1600 begins with providing a first circuit (e.g., 1102 of FIG. 11) including a baseband circuit and a radio circuit (1610). An FEM (e.g., 1104 of FIG. 11) is provided and placed remote from the first circuit and in close proximity to and coupled to at least one RF antenna (e.g., Ant-1 of FIG. 11). The FEM includes a transmit path including a PA (e.g., 1124 of FIG. 11), an envelope detector circuit (e.g., including D1 and 1120 of FIG. 11), and a supply modulator circuit (e.g., 1122 of FIG. 11) (1620). The supply modulator circuit is to provide a modulated supply voltage to the PA based on an envelope signal received from the envelope detector circuit to improve nonlinearity of the PA (1630). The FEM is coupled to the first circuit via an interface circuit including a single interconnection route (e.g., 1106 of FIG. 11), for communication of an RF signal between the first circuit and the FEM (1640). The envelope detector circuit is coupled to a detector (e.g., including D1 of FIG. 11) (1650).

Figure 17:
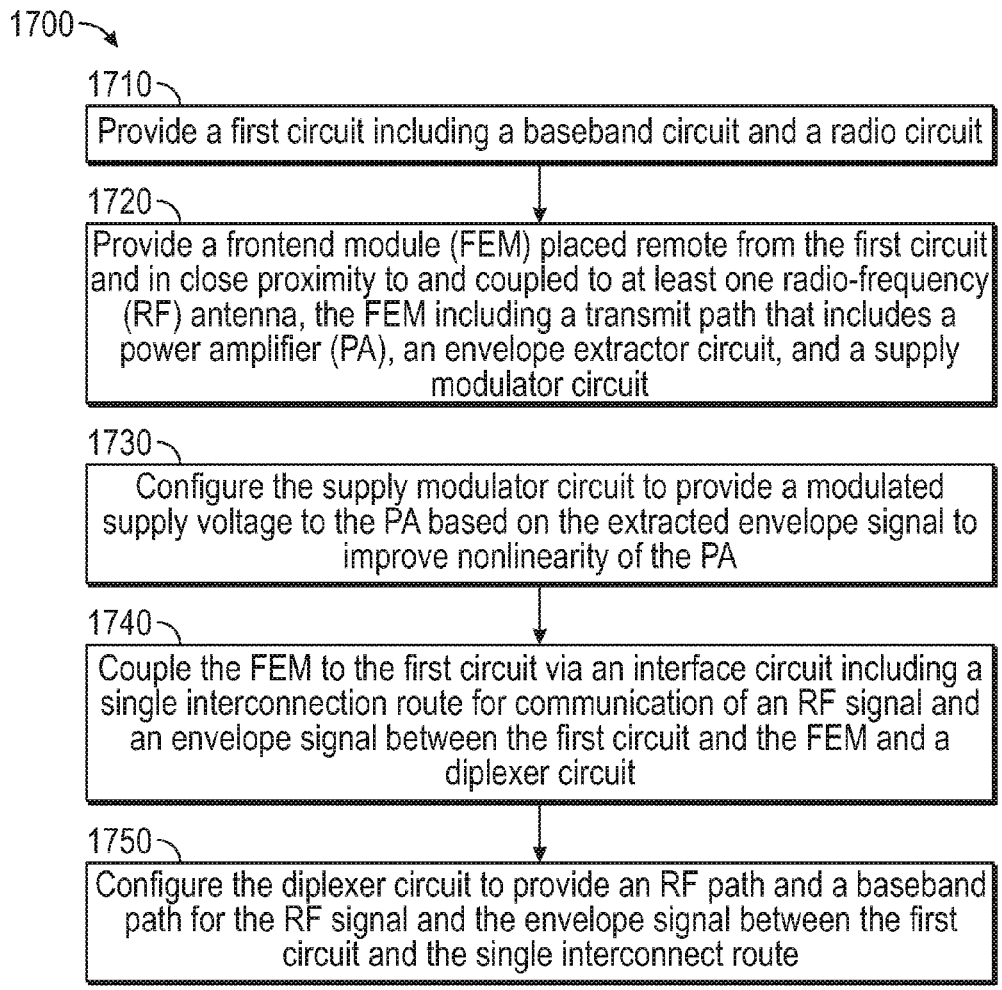
FIG. 17 is flow diagram illustrating a method of providing a wireless communication device with remote FEMs and including an ET circuit according to aspects of the subject technology.

FIG. 17 is flow diagram illustrating a method 1700 of providing a wireless communication device (e.g., 1200 of FIG. 12) with remote FEMs and including an ET circuit according to aspects of the subject technology. The method 1700 begins with providing a first circuit (e.g., 1202 of FIG. 12) including a baseband circuit and a radio circuit (1710). An FEM (e.g., 1204 of FIG. 12) is provided and placed remote from the first circuit and in close proximity to and coupled to at least one RF antenna (e.g., Ant-1 of FIG. 11). The FEM includes a transmit path including a PA (e.g., 1124 of FIG. 12), an envelope extractor circuit (e.g., 1230 of FIG. 12), and a supply modulator circuit (e.g., 1120 of FIG. 12) (1720). The supply modulator circuit is to provide a modulated supply voltage to the PA based on the extracted envelope signal to improve nonlinearity of the PA (1730). The FEM is coupled to the first circuit via an interface circuit (e.g., 1206 of FIG. 12) including a single interconnection route (e.g., 1206 of FIG. 12) for communication of an RF signal and an envelope signal between the first circuit and the FEM and a diplexer circuit (e.g., 1220 of FIG. 12) (1740). The diplexer circuit is to provide an RF path and a baseband path for the RF signal and the envelope signal between the first circuit and the single interconnect route (1750).

Figure 18:
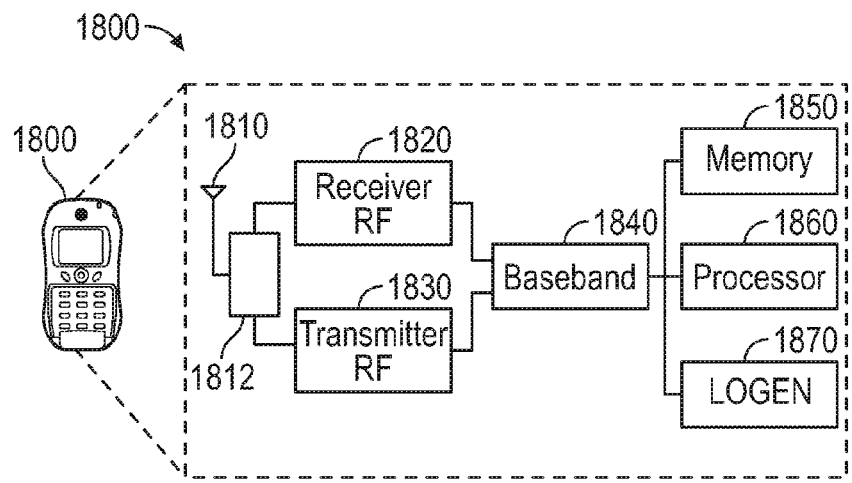
FIG. 18 is a block diagram illustrating an example wireless communication device in accordance with one or more implementations of the subject technology.

FIG. 18 is a block diagram illustrating an example wireless communication device in accordance with one or more implementations of the subject technology. The wireless communication device 1800 may comprise a radio-frequency (RF) antenna 1810, a receiver 1820, a transmitter 1830, a baseband processing module 1840, a memory 1850, a processor 1860, and a local oscillator generator (LOGEN) 1870. In various embodiments of the subject technology, one or more of the blocks represented in FIG. 18 may be integrated on one or more semiconductor substrates. For example, the blocks 1820-1870 may be realized in a single chip or a single system on chip, or may be realized in a multi-chip chipset.

The RF antenna 1810 may be suitable for transmitting and/or receiving RF signals (e.g., wireless signals) over a wide range of frequencies (e.g., 60 GHz band). Although a single RF antenna 1810 is illustrated, the subject technology is not so limited.

The receiver 1820 may comprise suitable logic circuitry and/or code that may be operable to receive and process signals from the RF antenna 1810. The receiver 1820 may, for example, be operable to amplify and/or down-convert received wireless signals. In various embodiments of the subject technology, the receiver 1820 may be operable to cancel noise in received signals and may be in close proximity to over a wide range of frequencies. In this manner, the receiver 1820 may be suitable for receiving signals in accordance with a variety of wireless standards. Wi-Fi, WiMAX, Bluetooth, and various cellular standards. In various embodiments of the subject technology, the receiver 1820 may not require any SAW filters and few or no off-chip discrete components such as large capacitors and inductors.

The transmitter 1830 may comprise suitable logic circuitry and/or code that may be operable to process and transmit signals from the RF antenna 1810. The transmitter 1830 may, for example, be operable to up-convert baseband signals to RF signals and amplify RF signals. In various embodiments of the subject technology, the transmitter 1830 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 1830 may be operable to provide signals for further amplification by one or more power amplifiers.

The duplexer 1812 may provide isolation in the transmit band to avoid saturation of the receiver 1820 or damaging parts of the receiver 1820, and to relax one or more design requirements of the receiver 1820. Furthermore, the duplexer 1812 may attenuate the noise in the receive band. The duplexer may be operable in multiple frequency bands of various wireless standards.

The baseband processing module 1840 may comprise suitable logic, circuitry, interfaces, and/or code that may be operable to perform processing of baseband signals. The baseband processing module 1840 may, for example, analyze received signals and generate control and/or feedback signals for configuring various components of the wireless communication device 1800 such as the receiver 1820. The baseband processing module 1840 may be operable to encode, decode, transcode, modulate, demodulate, encrypt, decrypt, scramble, descramble, and/or otherwise process data in accordance with one or more wireless standards. In some implementations, the baseband processing module 1840 can operate as the baseband processor of the radio and baseband circuit 1202 of FIG. 12 and generate the DPD signal that is provided to the DAC 1214 of FIG. 12.

The processor 1860 may comprise suitable logic, circuitry, and/or code that may enable processing data and/or controlling operations of the wireless communication device 1800. In this regard, the processor 1860 may be enabled to provide control signals to various other portions of the wireless communication device 1800. The processor 1860 may also control transfers of data between various portions of the wireless communication device 1800. Additionally, the processor 1860 may enable implementation of an operating system or otherwise execute code to manage operations of the wireless communication device 1800.

The memory 1850 may comprise suitable logic, circuitry, and/or code that may enable storage of various types of information such as received data, generated data, code, and/or configuration information. The memory 1850 may comprise, for example, RAM, ROM, flash, and/or magnetic storage. In various embodiment of the subject technology, Information stored in the memory 1850 may be utilized for configuring the receiver 1820 and/or the baseband processing module 1840.

The local oscillator generator (LOGEN) 1870 may comprise suitable logic, circuitry, interfaces, and/or code that may be operable to generate one or more oscillating signals of one or more frequencies. The LOGEN 1870 may be operable to generate digital and/or analog signals. In this manner, the LOGEN 1870 may be operable to generate one or more clock signals and/or sinusoidal signals. Characteristics of the oscillating signals such as the frequency and duty cycle may be determined based on one or more control signals from, for example, the processor 1860 and/or the baseband processing module 1840.

In operation, the processor 1860 may configure the various components of the wireless communication device 1800 based on a wireless standard according to which it is desired to receive signals. Wireless signals may be received via the RF antenna 1810 and amplified and down-converted by the receiver 1820. The baseband processing module 1840 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 1850, and/or information affecting and/or enabling operation of the wireless communication device 1800. The baseband processing module 1840 may modulate, encode and perform other processing on audio, video, and/or control signals to be transmitted by the transmitter 1830 in accordance to various wireless standards.

In some implementations, the RF receiver 1820, the RF transmitter 1830, the duplexer 1812, and the RF antenna 1810 may be realized, at least partially, remote from the rest of the components and modules of the wireless communication device 1800 (e.g., SOC), as described above with respect to FIGS. 2-10. In some embodiments, a PA of the RF transmitter 1830 can include envelope tracking features, as described above with respect to FIGS. 11-14.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wireless communication device, the device comprising:
   a first circuit including a baseband circuit and a radio circuit; and
   at least one frontend module (FEM) remote from the first circuit and coupled to at least one radio-frequency (RF) antenna, the FEM coupled to the first circuit via interface circuitry,
   wherein an FEM of the at least one FEM comprises a frontend (FE) circuit including one or more low-noise amplifiers (LNAs) and one or more power amplifiers (PAs) and at least one of a multi-pole switch and a multiplexer, the at least one of the multi-pole switch and the multiplexer being implemented on a first side of the FEM coupled to the interface circuitry, and wherein the interface circuitry includes at least some of filters, splitters, and multi-pole switches configured to reduce a count of interconnect routes to the at least one FEM.

2. The device of claim 1, wherein the at least one FEM comprise a first FEM and a second FEM, wherein the first FEM includes a 2.4 GHz (2 G) FE circuit, a first 5 GHZ (5 G) FE circuit, and a second 5 G FE circuit, wherein the first 5 G FE circuit, and the second 5 G FE circuit are coupled to the interface circuitry via respective first and second multi-pole switches.

3. The device of claim 2, wherein the radio circuit comprises main core radios and auxiliary (aux) core radios and a Bluetooth (BT) radio, wherein the radio circuit is configured to communicate a BT radio signal and multiple core radio signals, wherein the main core radios and aux core radios are configured to communicate respective 2 G-0, 2 G-1, 5 G-0, and 5 G-1 radio signals, and wherein the interface circuitry includes:

a first interface circuit including a first splitter and a first switch configured to couple the 2 G-1 radio signals of the main core and the aux core radios to the 2 G FE circuit of the first FEM,
   a second interface circuit including a second splitter and a second switch configured to couple the 2 G-0 radio signals of the main core radios and the aux core radios to the 2 G FE circuit of the second FEM, and
   conductive traces configured to directly couple the 5 G-1 radios of the main and aux core radios to the first and second multi-pole switches of the first FEM, directly couple the 5 G-0 radios of the main and aux core radios to the first and second multi-pole switches of the second FEM, and directly couple the BT radio to a first FE circuit of the second FEM.

4. The device of claim 3, wherein the first switch comprises a single-pole-3-throw (SP3T) switch, the first interface circuit further comprises a first filter, and the first and the second FEM further comprise transmit/receive (TR) switches, and wherein the SP3T switch is configurable to couple one of three 2 G radio signals through a first single interconnect route and the first filter to a first TR switch coupled to the 2 G FE circuit of the first FEM, wherein the three 2 G radio signals comprises a 2 G-1 receive (RX) radio signal, a 2 G-1 transmit (TX) signal from the main core, and a 2 G-1 TX signal from the aux core radio, and wherein couplings between a 2 G FE circuit of second FEM and the main and aux core radios is similar to the couplings between the 2 G FE circuit of the first FEM and the main and aux core radios.

5. The device of claim 4, wherein the 5 G-1 radio signals of the aux core are coupled via a second single interconnect route to a second TR switch coupled to a first 5 G FE circuit of the first FEM and the 5 G-1 radio signals of the main core are coupled via a third single interconnect route to a third TR switch coupled to the second 5 G FE circuit of the first FEM, wherein couplings between first and second 5 G FE circuits of the second FEM and the main and aux core radios are similar to the couplings between the first and second 5 G FE circuits of the first FEM and the main and aux core radios, and wherein the second interface circuit further includes a BT power amplifier (PA) and a single BT interconnect route coupling the BT radio to the 2 G FE circuit of the second FEM.

6. The device of claim 1, wherein the at least one FEM comprise a first FEM and a second FEM, wherein the first FEM includes a 2 G FE circuit and a 5 G FE circuit, first diplexer and a second diplexer, and wherein the 2 G FE circuit and the 5 G FE circuit are coupled via the second diplexer to a first RF antenna of the at least one RF antenna, wherein the first diplexer is configurable to couple a first port of the first FEM to the 2 G FE circuit and the 5 G FE circuit.

7. The device of claim 6, wherein the radio circuit comprises main core radios and aux core radios and a Bluetooth BT radio, wherein the radio circuit is configured to communicate a Bluetooth radio signal and multiple core radio signals, wherein the main core radios and aux core radios are configured to communicate respective 2 G-0, 2 G-1, 5 G-0, and 5 G-1 radio signals through respective TR switches, wherein a first interface circuit of the interface circuitry comprises a first switch/combiner circuit, a second switch/combiner circuit, and a third diplexer and is placed in close proximity to the first circuit, and wherein:
   the first switch/combiner circuit is configurable to selectively couple one of a BT radio signal, a 2 G-0 radio signal of the main core, or a 2 G-0 radio signal of the aux core radio to a 2 G port of the third diplexer, the second switch/combiner circuit is configurable to selectively couple one of a 5 G-0 radio signal of the main core radio or a 5 G-0 radio signal of the aux core radio to a 5 G port of the third diplexer, the third diplexer is coupled via a single interconnect route to the first port of the first FEM, and a second interface circuit of the interface circuitry is similarly configured to couple BT radio signal and 2 G-1 radio signals and 5 G-1 radio signals of the main and aux core radios to the second FEM.

8. The device of claim 6, wherein the 2 G FE circuit comprises a first 2 G TR switch and a second 2 G TR switch, wherein the 5 G FE circuit comprises a first 5 G TR switch and a second 5 G TR switch, wherein the first 2 G TR switch and the second 2 G TR switch are 3-terminal TR switches, wherein a third terminal of the 3-terminal TR switches is used for a digital pre-distortion (DPD) calibration loop-back to a linearization circuit of the baseband circuit, and wherein a PDP calibration is performed over air using a second RF antenna as a receive path.

9. The device of claim 1, wherein the at least one FEM comprise a first FEM and a second FEM, wherein the first FEM includes a 2 G FE circuit, a first 5 G FE circuit, a second 5 G FE circuit, a first triplexer, and a second triplexer, wherein the 2 G FE circuit, the first and the second 5 G FE circuits are coupled via the second triplexer to a first RF antenna of the at least one RF antenna, and wherein the 2 G FE circuit, the first and the second 5 G FE circuits are coupled via the first triplexer to a single interconnect route a first interface circuit of the interface circuitry.

10. The device of claim 9, wherein the radio circuit comprises main core radios and aux core radios and a BT radio, wherein the radio circuit is configured to communicate a BT radio signal and multiple core radio signals, wherein the main core radios and aux core radios are configured to communicate respective 2 G-0, 2 G-1, 5 G-0, and 5 G-1 radio signals through respective TR switches, wherein the first interface circuit comprises a 2 G switch/combiner circuit, a 5 G switch circuit, and a third triplexer and is placed in close proximity to the first circuit, wherein:

the 2 G switch/combiner circuit is configurable to selectively couple one of a BT radio signal, a 2 G-0 radio signal of the main core, or a 2 G-0 radio signal of the aux core radio to a first port of the third triplexer, the 5 G switch circuit comprises a double-pole-double-throw (DPDT) switch and is configurable to selectively couple a 5 G-0 radio signal of the main core and a 5 G-0 radio signal of the aux core radio to a second and a third ports or the third and the second ports of the third triplexer, respectively, and a second interface circuit of the interface circuitry is similarly configured to couple 2 G-1 radio signals and 5 G-1 radio signals of the main and aux core radios to the second FEM.

11. The device of claim 1, wherein the at least one FEM comprise a first FEM and a second FEM, wherein the first FEM includes a 2 G FE circuit and a 5 G FE circuit, and a first diplexer and wherein the 2 G FE circuit and the 5 G FE circuit are coupled via the first diplexer to a first RF antenna of the at least one RF antenna, wherein the 2 G FE circuit comprises a 2 G DPD detector, a first 2 G TR switch and a second 2 G TR switch, wherein the 5 G FE circuit comprises a 5 G DPD detector, a first 5 G TR switch and a second 5 G TR switch, the first 2 G TR switch and the first 5 G TR switch are 3-terminal switches.

12. The device of claim 11, wherein the 2 G DPD detector is coupled to the first 5 G TR switch, wherein the 5 G DPD detector is coupled to the first 2 G TR switch, wherein the first 2 G TR switch couples a PA and an LNA of the first FE circuit and the 5 G DPD detector to a 2 G interconnect route of a first interface circuit of the interface circuitry, and wherein the first 5 G TR switch couples a PA and an LNA of a second FE circuit and the 2 G DPD detector to a 5 G interconnect route of the first interface circuit of the interface circuitry.

13. The device of claim 12, wherein the radio circuit comprises main core radios and aux core radios and a BT radio, wherein the radio circuit is configured to communicate a BT radio signal and multiple core radio signals, wherein the main core radios and aux core radios are configured to communicate respective 2 G-0, 2 G-1, 5 G-0, and 5 G-1 radio signals through respective TR switches, wherein the first interface circuit comprises a 2 G switch/combiner circuit and a 5 G switch/combiner circuit and is placed in close proximity to the first circuit, wherein:

the 2 G switch/combiner circuit is configurable to selectively couple one of a BT radio signal, a 2 G-0 radio signal of the main core, or a 2 G-0 radio signal of the aux core radio to the 2 G interconnect route of a first interface circuit, the 5 G switch/combiner circuit is configurable to selectively couple one of a 5 G-0 radio signal of the main core, or a 5 G-0 radio signal of the aux core radio to the 5 G interconnect route of a first interface circuit, and a second interface circuit of the interface circuitry is similarly configured to couple the 2 G-1 radio signals and 5 G-1 radio signals of the main and aux core radios to the second FEM.

14. The device of claim 1, wherein the at least one FEM comprise a first FEM and a second FEM, wherein the first FEM includes a 2 G FE circuit, a first 5 G FE circuit, a second 5 G FE circuit, a first diplexer, a first triplexer, and a first switch, wherein the 2 G FE circuit, the first and the second 5 G FE circuits are coupled via the first triplexer to a first RF antenna of the at least one RF antenna, and wherein the 2 G FE circuit is coupled to a 2 G port of the first diplexer, wherein a 5 G port of first diplexer is coupled to a first input port of the first switch, wherein the first and the second 5 G FE circuits, respectively, comprise a first and a second 3-terminal (3-T) TR switch, wherein first and second output ports of the first switch are coupled to the first 3T TR switch and the second 3T TR switch, respectively.

15. The device of claim 14, wherein the 2 G FE circuit includes a first detector coupled to a respective PA output of the 2 G FE circuit, wherein the first 5 G FE circuit includes a second detector coupled to a respective PA output of the first 5 G FE circuit, wherein the second 5 G FE circuit includes a third detector coupled to a respective PA output of the second 5 G FE circuit, wherein the first and the second detectors are coupled via a second switch to the second 3T TR switch, and the third detector is coupled to the first 3T TR switch.

16. The device of claim 15, wherein the radio circuit comprises main core radios and aux core radios and a BT radio, wherein the radio circuit is configured to communicate a BT radio signal and multiple core radio signals, wherein the main core radios and aux core radios are configured to communicate respective 2 G-0, 2 G-1, 5 G-0, and 5 G-1 radio signals through respective TR switches, wherein a first interface circuit of the interface circuitry is configured to couple the main core radios and aux core radios and the BT radio to the first FEM, and wherein first interface circuit comprises a 2 G switch/splitter circuit, and a second diplexer and is placed in close proximity to the first circuit, wherein:
  the 2 G switch/splitter circuit is configurable to selectively couple one of a BT radio signal, a 2 G-0 radio signal of the main core, or a 2 G-0 radio signal of the aux core radio to a first port of the second diplexer,
  a 5 G-0 radio signal of the main core radio is coupled to a second port of the second diplexer,
  a 5 G-0 radio signal of the aux core radio is coupled via a first interconnect route to a second input port of the first switch of the first FEM, a third port of the second diplexer is coupled to a third port of the first diplexer of the first FEM, and
  a second interface circuit of the interface circuitry is similarly configured to couple the 2 G-1 radio signals and 5 G-1 radio signals of the main and aux core radios to the second FEM.

17. The device of claim 1, wherein the at least one FEM comprise a first FEM and a second FEM, wherein the first FEM includes a 2 G FE circuit, a 5 G FE circuit, a first diplexer, a first triplexer, and a first buffer circuit, wherein the 2 G FE circuit and the 5 G FE circuit are coupled via the first diplexer to a first RF antenna of the at least one RF antenna, and wherein the 2 G FE circuit is coupled to a first port of the first triplexer, wherein the 5 G FE circuit includes a first mixer coupled to a second port of the first triplexer and to an output of the first buffer circuit and is configured to downconverter a 10 G signal using, as a local oscillator (LO) signal, an output signal of the first buffer circuit, and wherein an input of the first buffer circuit is coupled to a third port of the first triplexer.

18. The device of claim 17, wherein a first interface circuit of the interface circuitry is configured to couple the radio circuit to the first FEM, and wherein first interface circuit comprises a second triplexer circuit coupled via a single interconnect route to the first triplexer of the first FEM circuit, wherein the second triplexer is placed in close proximity to the first circuit, wherein the radio circuit comprises at least one 2 G radio circuit comprising a 2 G TR switch coupled to a first port of the second triplexer and at least one 10.8 GHz (10 G) radio circuit comprising a 10 G TR switch coupled to a second port of the second triplexer, and the radio circuit is configured to provide a 5 G LO signal to a third port of the second triplexer circuit.

19. The device of claim 18, wherein the radio circuit further comprises a first multiplexer, wherein the 10 G TR switch is coupled to the second port of the second triplexer through the multiplexer, wherein the first multiplexer is configurable to couple one of the 10 G TR switch or a 12 GHz (12 G) signal associated with a second mixer to the second port of the second triplexer, wherein the second mixer is configured to down-convert the 12 G signal to a 2 G signal for coupling to a 2 G RX path of the at least one 2 G radio circuit to provide a path for a 2 G DPD calibration loop-back signal of the 2 G FE circuit to the radio circuit.

20. The device of claim 19, wherein the radio circuit further comprises a second multiplexer, wherein the 5 G LO signal is coupled to the second port of the second triplexer through the second multiplexer, wherein the second multiplexer is configured to couple one of the 5 G LO signal or a 4.8 GHz (4 G) tone to the second port of the second triplexer, wherein the 2 G FE circuit further includes a detector configured to couple an output of a PA of the 2 G FE circuit to a third mixer circuit configured to up-convert the 2 G DPD calibration loop-back signal of the 2 G FE circuit to the 12 G signal, wherein the first FEM further includes a second buffer circuit, a third multiplexer, and a fourth multiplexer, wherein the input of the first buffer circuit is coupled to the third port of the first triplexer through the third multiplexer.

21. The device of claim 20, wherein the third multiplexer is configured to couple the third port of the first triplexer to one of the input of the first buffer circuit or an input of the second buffer circuit, wherein the fourth multiplexer is configured to couple one of the 5 G FE circuit or the 12 G signal from the third mixer circuit to the second port of the first triplexer.

22. The device of claim 1, wherein the at least one FEM comprise a first FEM and a second FEM, wherein the first FEM includes a 2 G FE circuit, a 5 G FE circuit, a diplexer, a 2 G transceiver, and a 5 G transceiver, wherein the 2 G transceiver comprises 2 G down-converter, a 2 G up-converter, and a 2 G LO generator, wherein the 2 G down-converter is configured to down-convert a 2 G RX signal to a first IF signal and the 2 G up-converter is configured to up-convert a second IF signal to a 2 G TX signal coupled to the 2 G FE circuit.

23. The device of claim 22, the 5 G transceiver comprises 5 G down-converter, a 5 G up-converter, and a 5 G LO generator, wherein the 5 G down-converter is configured to down-convert a 5 G RX signal to a first IF signal and the 5 G up-converter is configured to up-convert a second IF signal to a TX 5 G signal coupled to the 5 G FE circuit.

24. The device of claim 23, wherein a first interface circuit of the interface circuitry comprises a 2 G interface circuit and a 5 G interface circuit, wherein the 2 G interface circuit comprises a first triplexer positioned in a close proximity of the first FEM, a second triplexer positioned in a close proximity of the baseband circuit, and a first single interconnect route coupling the first triplexer to the second triplexer, wherein a first, a second, and a third port of the first triplexer are respectively coupled to the 2 G down-converter, the 2 G up-converter, and the 2 G LO generator.

25. The device of claim 24, wherein the 5 G interface circuit comprises a third triplexer positioned in a close proximity of the first FEM, a fourth triplexer positioned in a close proximity of the baseband circuit, and a second single interconnect route coupling the third triplexer to the fourth triplexer, wherein a first, a second, and a third port of the third triplexer are respectively coupled to the 5 G down-converter, the 5 G up-converter, and the 5 G LO generator.

26. The device of claim 25, wherein the baseband circuit comprises a 2 G baseband (BB) up-and-down-converter, a 5 G BB up-and-down-converter, wherein the 2 G BB up-and-down-converter is coupled to a first, a second, and a third port of the second triplexer, and wherein the 5 G BB up-and-down-converter is coupled to a first, a second, and a third port of the fourth triplexer.

27. A wireless communication device, the device comprising:
  a first circuit including a radio circuit and a baseband circuit; and
  a frontend module (FEM) remote from the first circuit and placed in close proximity to and coupled to at least one radio-frequency (RF) antenna, the FEM coupled to the first circuit via an interface circuit,
  wherein:
  the FEM comprises a transmit path including a power amplifier (PA), an envelope generator circuit, and a supply modulator circuit configured to provide a modulated supply voltage to the PA based on an envelope signal received from the envelope generator circuit to improve nonlinearity of the PA, the interface circuit comprises a single interconnection route for communication of an RF signal between the first circuit and the FEM, and the envelope generator circuit is coupled to a detector configured to couple the RF signal to the envelope generator circuit.

28. A wireless communication device, the device comprising:

a first circuit including a radio circuit and a baseband circuit; and a frontend module (FEM) remote from the first circuit and placed in close proximity to and coupled to at least one radio-frequency (RF) antenna, the FEM coupled to the first circuit via an interface circuit for communication of an RF signal and an envelope signal between the first circuit and the FEM, wherein:

the FEM comprises a transmit path including:

a power amplifier (PA), an envelope extractor circuit configured to extract the envelope signal from the RF signal, and a supply modulator circuit configured to provide a modulated supply voltage to the PA based on the extracted envelope signal to improve nonlinearity of the PA, and the interface circuit further comprises a diplexer circuit configured to provide an RF path and a baseband path for the RF signal and the envelope signal between the first circuit and a single interconnect route coupling the first circuit to the FEM.

29. The device of claim 28, wherein the diplexer circuit comprises a first capacitor in the RF path and a first inductor in the baseband path, wherein the envelope extractor circuit comprises a filter including a second capacitor and a second inductor.

30. The device of claim 28, wherein the diplexer circuit comprises a first capacitor in the RF path and a first LC resonator in the baseband path, wherein the envelope extractor circuit comprises a filter including a second capacitor and a second LC resonator, wherein the filter further includes a third LC resonator circuit configured to further filter the envelope signal by directing an RF component to a ground potential node.

* * * * *